US011199413B2

(12) United States Patent
Weissman et al.

(10) Patent No.: US 11,199,413 B2
(45) Date of Patent: Dec. 14, 2021

(54) NAVIGATION TECHNIQUES FOR AUTONOMOUS AND SEMI-AUTONOMOUS VEHICLES

(71) Applicant: QUALCOMM Incorporated, San Diego, CA (US)

(72) Inventors: Haim Mendel Weissman, Haifa (IL); Elimelech Ganchrow, Zichron Yaakov (IL); Arik Mimran, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 520 days.

(21) Appl. No.: 16/039,686

(22) Filed: Jul. 19, 2018

(65) Prior Publication Data

US 2020/0025575 A1 Jan. 23, 2020

(51) Int. Cl.
*G01C 21/28* (2006.01)
*G01S 13/86* (2006.01)
(Continued)

(52) U.S. Cl.
CPC ............ *G01C 21/28* (2013.01); *G01S 13/865* (2013.01); *G01S 13/867* (2013.01);
(Continued)

(58) Field of Classification Search
CPC ..... G01C 21/28; G01S 13/865; G01S 13/751; G01S 13/931; G01S 17/06; G01S 17/86;
(Continued)

(56) References Cited

U.S. PATENT DOCUMENTS 8,949,024 B2 2/2015 Stanley et al.
9,170,116 B1 10/2015 Joshi et al.
(Continued)

FOREIGN PATENT DOCUMENTS

EP 2891899 A1 * 7/2015 ........... G01S 13/865
KR 20150066182 A * 6/2015
(Continued)

OTHER PUBLICATIONS

Partial International Search Report—PCT/US2019/040937—ISA/EPO—dated Nov. 7, 2019.
(Continued)

*Primary Examiner* — Donald J Wallace
(74) *Attorney, Agent, or Firm* — Qualcomm Incorporated

(57) ABSTRACT

Techniques for operating a navigation system are provided. An example method according to these techniques includes determining a first localization solution associated with a location of the vehicle in a navigable environment using a radar transceiver of the navigation system, determining a second localization solution associated with the location of the vehicle in the navigable environment using a LiDAR transceiver, a camera, or both of the navigation system, selecting a localization solution from the first and second localization solutions based on whether an accuracy of the first localization exceeds an accuracy of the second localization solution, and utilizing the selected vehicle localization solution for navigation of the vehicle through the navigable environment.

23 Claims, 24 Drawing Sheets

(51) Int. Cl.
    *G05D 1/00*         (2006.01)
    *G05D 1/02*         (2020.01)

(52) U.S. Cl.
    CPC ......... *G05D 1/0088* (2013.01); *G05D 1/0231* (2013.01); *G05D 1/0257* (2013.01); *G05D 2201/0213* (2013.01)

(58) Field of Classification Search
    CPC .. G05D 1/0088; G05D 1/0231; G05D 1/0257; G05D 2201/0213
    See application file for complete search history.

(56) References Cited

U.S. PATENT DOCUMENTS

| | | | | |
|---|---|---|---|---|
| 10,852,731 | B1* | 12/2020 | Braley | G05D 1/0088 |
| 2014/0236477 | A1* | 8/2014 | Chen | G07C 5/008 |
| | | | | 701/450 |
| 2015/0117723 | A1* | 4/2015 | Joshi | G09B 29/106 |
| | | | | 382/113 |
| 2015/0321665 | A1* | 11/2015 | Pandita | B60W 30/0956 |
| | | | | 701/409 |
| 2015/0378015 | A1* | 12/2015 | You | G01S 19/48 |
| | | | | 701/469 |
| 2016/0098496 | A1* | 4/2016 | Joshi | G01C 21/3815 |
| | | | | 703/1 |
| 2016/0146618 | A1* | 5/2016 | Caveney | B60W 50/14 |
| | | | | 701/25 |
| 2017/0015317 | A1 | 1/2017 | Fasola et al. | |
| 2017/0030722 | A1 | 2/2017 | Kojo | |
| 2017/0045362 | A1 | 2/2017 | Song et al. | |
| 2017/0307746 | A1* | 10/2017 | Rohani | G01S 7/412 |
| 2017/0370729 | A1 | 12/2017 | Laur et al. | |
| 2018/0052222 | A1* | 2/2018 | Zeisler | G01S 7/497 |
| 2018/0089538 | A1* | 3/2018 | Graham | G01S 17/86 |
| 2019/0086539 | A1* | 3/2019 | Shin | G01S 7/4817 |
| 2019/0132572 | A1* | 5/2019 | Shen | H04N 13/271 |
| 2020/0256977 | A1* | 8/2020 | Passmann | G01S 13/89 |

FOREIGN PATENT DOCUMENTS

| | | | | |
|---|---|---|---|---|
| WO | | 2017181642 A1 | 10/2017 | |
| WO | WO-2018142194 A1 * | | 8/2018 | G07B 15/063 |

OTHER PUBLICATIONS

International Search Report and Written Opinion—PCT/US2019/040937—ISA/EPO—dated Jan. 21, 2020.

\* cited by examiner

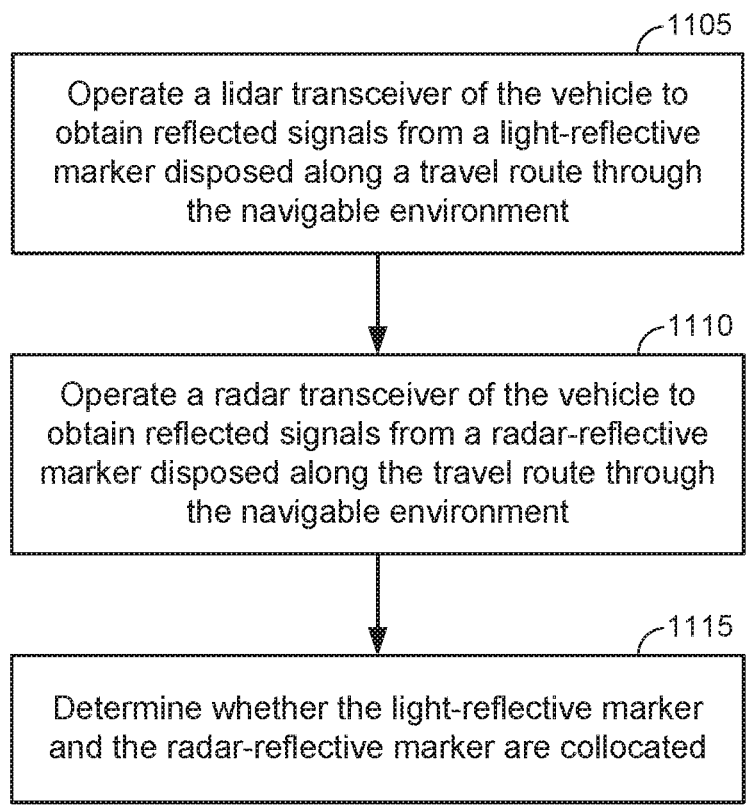

| Distance to Bottom | Pole height | Distance to top | Spreading error | T(nsec) |
|---|---|---|---|---|
| 200meter | 10meter | 200.2meter | 0.2meter | 0.8nsec |
| 100meter | 10meter | 100.5meter | 0.5meter | 1.7nsec |
| 50meter | 10meter | 51.0meter | 1.0meter | 3.3nsec |

Navigate the vehicle through the navigable environment using the selected localization solution

Generate an alert to a driver of the vehicle based on the localization solution

Provide the selected localization solution to a driver of the vehicle

*FIG. 20*

NAVIGATION TECHNIQUES FOR AUTONOMOUS AND SEMI-AUTONOMOUS VEHICLES

BACKGROUND

Self-driving vehicles are vehicles that are capable of sensing the environment around the vehicle and navigating the vehicle without input from a human driver. Improvements in sensor and control technology have led to significant advances in autonomous vehicle technology. However, conventional solutions to autonomous vehicle navigation often require significant and expensive improvements in the roads and the surrounding infrastructure to enable autonomous vehicles to determine their location and to safely navigate the road system. There are many challenges to safely implementing autonomous driving vehicles as the roadways are designed for manually operated vehicle and are not designed with autonomous traffic mind. Huge investments infrastructure would be required to fully replace and/or upgrade existing roadways to facilitate autonomous vehicle traffic.

SUMMARY

An example method for operating a navigation system according to the disclosure includes determining a first localization solution associated with a location of the vehicle in a navigable environment using a radar transceiver of the navigation system, determining a second localization solution associated with the location of the vehicle in the navigable environment using a LiDAR transceiver, a camera, or both of the navigation system, selecting a localization solution from the first and second localization solutions based on whether an accuracy of the first localization exceeds an accuracy of the second localization solution, and navigating the vehicle through the navigable environment using the selected vehicle localization solution Implementations of such a method can include one or more of the following features. Determining whether the accuracy of the first localization solution exceeds an accuracy of the second localization solution by determining a distance between the first localization solution and the second localization solution and determining whether the distance exceeds an expected accuracy of the second localization solution. Selecting the first localization solution responsive to the distance exceeding the estimated accuracy of the second localization solution. Selecting the second localization solution responsive to the distance not exceeding the estimated accuracy of the second localization solution. Determining whether the accuracy of the first localization solution exceeds an accuracy of the second localization solution by determining whether the second localization solution falls within the first localization solution, and selecting a localization solution from the first and second localization solutions based on whether the second localization falls within the first localization solution, such that the first localization solution is selected unless the second localization solution falls within the second localization solution. Selecting the localization solution includes determining a reliability score for each localization solution and discarding each localization solution for which the reliability score associated with that localization solution is less than a predetermined threshold. Alerting a driver of the vehicle to assume control of the vehicle responsive to both the first and second localization solutions being discarded. Selecting a first localization solution or a second localization solution includes determining whether the first localization solution and the second localization solution fall within a navigable region. Determining whether the first localization solution and the second localization solution fall within a navigable region includes comparing the first localization solution and the second localization solution to map information for a navigable environment. LiDAR and radar reflectors are disposed proximate to navigable portions of the navigable environment. LiDAR and radar reflectors are disposed on existing infrastructure elements of the navigable environment. At least a portion of the radar reflectors are polarized, and wherein the first localization solution utilizes dual-polarized radar. At least a portion of the radar reflectors are disposed on a radar absorptive material.

An example navigation system according to the disclosure includes a radar transceiver configured to transmit signals to and receive return signals from radar-reflective markers disposed in a navigable environment, a LiDAR transceiver configured to transmit signals to and receive return signals from light-reflective markers disposed in a navigable environment, a memory, and a processor coupled to the memory, the radar-transceiver, and the LiDAR transceiver. The processor configured to determine a first localization solution associated with a location of the vehicle in a navigable environment using a radar transceiver of the navigation system, determine a second localization solution associated with the location of the vehicle in the navigable environment using a LiDAR transceiver, a camera, or both of the navigation system, select a localization solution from the first and second localization solutions based on whether an accuracy of the first localization exceeds an accuracy of the second localization solution, and navigate the vehicle through the navigable environment using the selected vehicle localization solution.

An example navigation system according to the disclosure includes means for determining a first localization solution associated with a location of the vehicle in a navigable environment using a radar transceiver of the navigation system, means for determining a second localization solution associated with the location of the vehicle in the navigable environment using a LiDAR transceiver, a camera, or both of the navigation system, means for selecting a localization solution from the first and second localization solutions based on whether an accuracy of the first localization exceeds an accuracy of the second localization solution, and means for navigating the vehicle through the navigable environment using the selected vehicle localization solution.

An example non-transitory, computer-readable medium, having stored thereon computer-readable instructions for operating a navigation system, according to the disclosure includes instructions configured to cause the navigation system to determine a first localization solution associated with a location of a vehicle in a navigable environment using a radar transceiver of the navigation system, determine a second localization solution associated with the location of the vehicle in the navigable environment using a LiDAR transceiver, a camera, or both of the navigation system, select a localization solution from the first and second localization solutions based on whether an accuracy of the first localization exceeds an accuracy of the second localization solution, and navigate the vehicle through the navigable environment using the selected vehicle localization solution.

An example method for generating navigational data according to the disclosure includes generating navigational data for the navigable environment, the navigational data comprising locations of radar-reflective markers disposed throughout the navigable environment, wherein generating the navigational data includes determining the locations of the radar-reflective markers using light-reflective markers disposed throughout the navigable environment.

Implementations of such a method can include one or more of the following features. Determining the locations of the radar-reflective markers using the light-reflective markers disposed throughout the navigable environment further includes operating a LiDAR transceiver of the vehicle to obtain reflected signals from a light-reflective marker disposed along a travel route through the navigable environment, operating a radar transceiver of the vehicle to obtain reflected radar signals from a radar-reflector disposed along a travel route through the navigable environment, and determining whether the light-reflective marker and the radar-reflective marker are collocated. The radar-reflective marker is mounted proximate to the light-reflective marker. The radar-reflective marker is integrated with the light-reflective marker. Determining whether the light-reflective marker and the radar-reflective marker are collocated includes determining whether the radar-reflective marker is less than a predetermined distance from the light-reflective marker. The predetermined distance is an estimated error associated with the radar transceiver. The radar-reflective marker includes a coarse-resolution marker. The coarse-resolution marker includes a radar-reflective component of existing infrastructure. The radar-reflective marker includes a fine-resolution marker. The fine-resolution marker is disposed on existing infrastructure of the navigable environment. Identifying malfunctioning or missing radar-reflective or light-reflective markers and sending updates to the navigation data to a navigation server identifying the malfunctioning or missing markers.

An example navigation system according to the disclosure includes a radar transceiver configured to transmit signals to and receive return signals from radar-reflective markers disposed in a navigable environment, a LiDAR transceiver configured to transmit signals to and receive return signals from laser-reflective markers disposed in a navigable environment, a memory, and a processor coupled to the memory, the radar-transceiver, and the LiDAR transceiver. The processor is configured to generate navigational data for the navigable environment, the navigational data comprising locations of radar-reflective markers disposed throughout the navigable environment, wherein the processor is further configured to determine the locations of the radar-reflective markers using light-reflective markers disposed throughout the navigable environment.

An example navigation system according to the disclosure includes means for generating navigational data for the navigable environment, the navigational data comprising locations of radar-reflective markers disposed throughout the navigable environment, wherein the means for generating the navigational data includes means for determining the locations of the radar-reflective markers using light-reflective markers disposed throughout the navigable environment An example non-transitory, computer-readable medium, having stored thereon computer-readable instructions for generating navigational data, according to the disclosure includes instructions configured to cause the navigation system to generate navigational data for the navigable environment, the navigational data comprising locations of radar-reflective markers disposed throughout the navigable environment, wherein the instructions configured to cause the navigation system to generate the navigational data include instructions configured to cause the navigation system to determine the locations of the radar-reflective markers using light-reflective markers disposed throughout the navigable environment.

BRIEF DESCRIPTION OF THE DRAWING

FIG. 10 is a flow diagram of an example process for generating navigational data according to the techniques disclosed herein.

FIG. 11 is a flow diagram of an example process for generating navigational data according to the techniques disclosed herein.

FIG. 15 is a table providing example radar reflection data for a pole according to the disclosure.

FIG. 18 is a flow diagram of a process for performing one or more actions in response to a selected localization solution according to the techniques disclosed herein.

FIG. 19 is a flow diagram of a process for performing one or more actions in response to a selected localization solution according to the techniques disclosed herein.

FIG. 20 is a flow diagram of a process for performing one or more actions in response to a selected localization solution according to the techniques disclosed herein.

DETAILED DESCRIPTION

Figure 1A:
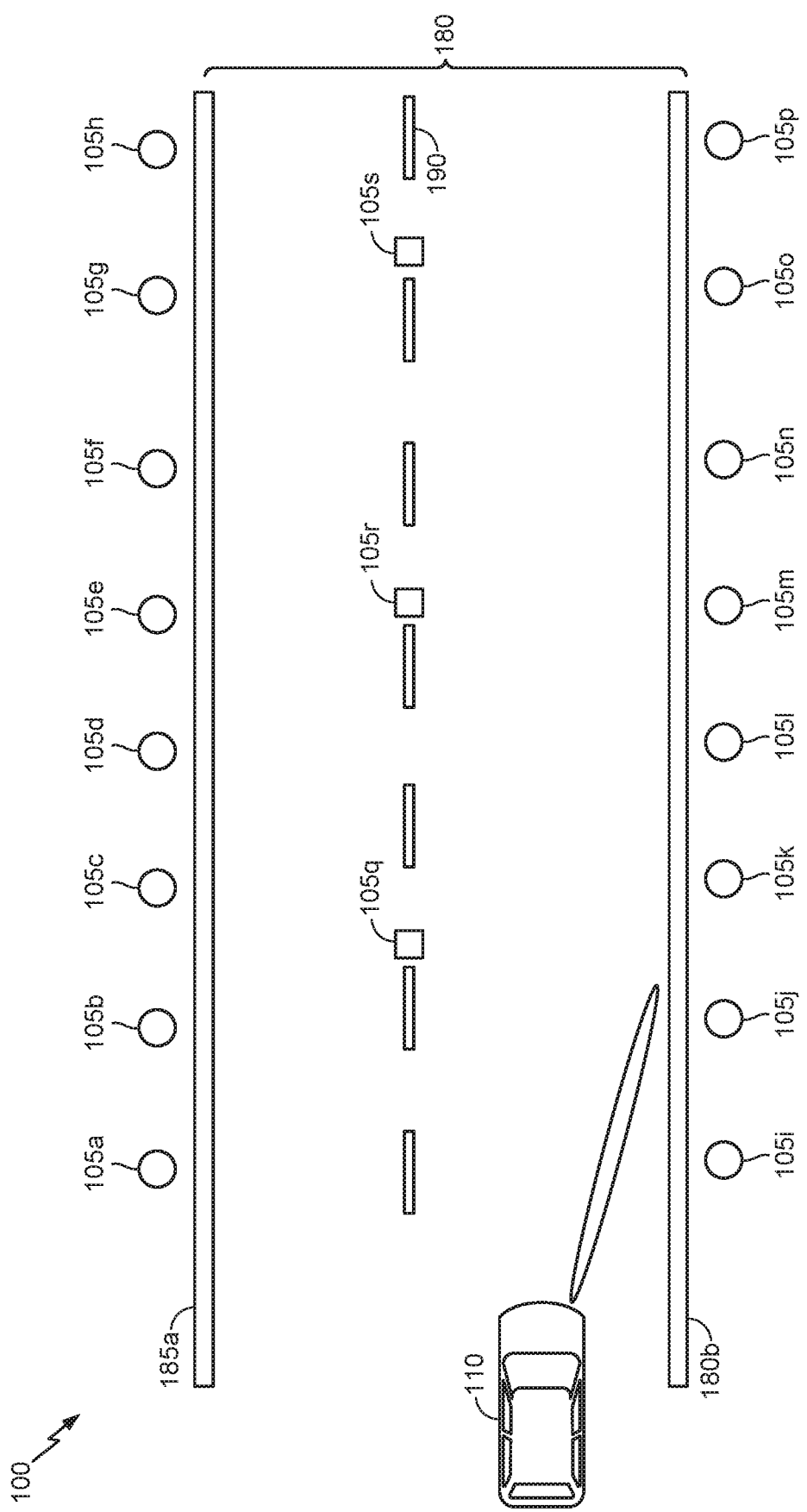
FIG. 1A is a block diagram of an example operating environment in which the techniques illustrated herein can be implemented.

Techniques for navigating a vehicle are provided. The techniques disclosed herein can be used with self-driving vehicles which are configured to autonomously navigate without driver intervention and with semi-autonomous vehicles which are configured such that a driver may assume full or partial control of the navigation of the vehicle. The navigation system of semi-autonomous vehicles may provide "driver-assist" features in which the navigation system of the vehicle can assume full or partial control of the navigation of the vehicle, but the driver of the vehicle may override or otherwise assume full or partial manual control over the navigation of the vehicle from the navigation system. The navigation system of the vehicle a radar transceiver, a LiDAR transceiver, or both. A LiDAR transceiver is configured to receive reflected laser signals from light-reflective reflectors disposed on the markers.

The techniques disclosed herein provide for very accurate localization of autonomous and semi-autonomous vehicles that can be used to navigate the vehicles through a navigable environment. The localization techniques can use vehicle LiDAR and/or radar to detect radar-reflective and/or light-reflective markers disposed along and/or around a roadway. At least a portion of the radar-reflective markers can include a millimeter wave radio-identification tag (RFID-MMID) tag disposed on the marker that can be activated by a radar signal transmitted by the navigation system of the autonomous or semi-autonomous vehicle. The RFID-MMID tags can be configured to transmit a modulated backscatter signal that includes tag identification information, such as a tag identifier and/or geographical coordinates of the marker on which the RFID-MMID tag is disposed. The tag identification information can also include information relating to the locations of the expected upcoming radar markers locations.

Techniques for determining whether to use LiDAR or radar to determine a localization solution for the vehicle are disclosed herein. Furthermore, the navigation system of the vehicle can include more than one radar transceiver, and techniques are disclosed herein for determining which radar transceiver or radar transceivers should be used to determine a localization solution for the vehicle. Techniques for creating map data indicative of the locations of radar-reflective markers is also provided in which LiDAR is used to determine the location of the markers to provide a more accurate location determination for the markers that would otherwise be possible using radar only.

The techniques disclosed herein are not limited to navigating an autonomous or semi-autonomous vehicle, and can also be used with robots, drones, and/or other autonomous or semi-autonomous machines that can navigate through an indoor and/or outdoor environment. These techniques can use markers similar those disclosed herein disposed along or around navigable regions of indoor and/or outdoor venues through which such autonomous or semi-autonomous machines can navigate. For example, autonomous or semi-autonomous machines can be configured to navigate indoor (or at least partially indoor venues, such as shopping centers, warehouses, housing facilities, storage facilities, and/or factories to deliver goods, perform maintenance, and/or to perform other tasks. In such implementations, the navigation system of the machine can include map information for the indoor and/or outdoor environment that identifies navigable portions of the indoor and/or outdoor environment and that can be used to determine a refined location for the autonomous or semi-autonomous machine by eliminating estimated locations for the machine that fall outside of the navigable areas of the indoor and/or outdoor environment. The map information can comprise two-dimensional (2D) and/or three-dimensional (3D) map information for the indoor and/or outdoor environment. The 2D and/or 3D map information can be used to generate or to estimate a navigation route through the indoor and/or outdoor environment. For implementations where the autonomous or semi-autonomous machine comprises a drone, the 2D and/or 3D map information can be used to generate a flight path or an estimated flight path through the indoor and/or outdoor environment. The terms "road" or "roadway" as used herein can be used to refer broadly to a navigable path through an indoor and/or outdoor environment that may be navigated by any of the various types of autonomous or semi-autonomous machines discussed above. Furthermore, the terms "road map" or "road map information" as used herein can be used to refer broadly to a map or map information that includes information identifying such navigable paths through an indoor and/or outdoor environment.

FIG. 1A is a block diagram of an example operating environment 100 (also referred to herein as a "navigable environment") in which the techniques illustrated herein can be implemented. While the example implementation illustrated in FIG. 1A illustrates an example of the techniques disclosed herein implemented on a roadway, the techniques disclosed herein could alternatively be implemented in other types of indoor and/or outdoor navigable environments as discussed above. Furthermore, while the example implementation illustrated in FIG. 1A and those discussed in the various examples in the subsequent figures refer to an autonomous or semi-autonomous vehicle, the techniques disclosed herein are not limited to vehicles and can also be applied to other types of autonomous or semi-autonomous machines that can navigate through a navigable environment.

The example operating environment 100 illustrates a portion of a roadway 180, but the techniques disclosed herein can be utilized in other types of navigable environments such as those discussed above, and the example illustrated in FIG. 1A is not intended to limit the techniques disclosed herein to a particular configuration of the navigable environment. Returning now to FIG. 1A, the example roadway includes two traffic lanes demarcated by a broken center line 190 and two solid lines 185a and 185b demarcating the shoulders of the roadway. The roadway 180 is provided an example for illustrating the techniques disclosed herein. However, these techniques are not limited to this type of roadway, and can be utilized on single-lane roadways, multi-lane roadways having one-way traffic or two-way traffic, highways, expressways, toll-roads, etc. The roadway 180 has a plurality of markers 105 disposed along each side of the roadway 180 and along the center line 190. Individual markers are identified using a letter. In this example, markers 105a-105p are disposed along the sides of the roadway 180 and markers 105r-105t are disposed along the center line 190. The spacing and positioning of the markers 105 illustrated in FIG. 1A is merely an example of one possible layout of the markers 105. The markers 105 can be reflectors disposed along the road surface, and/or can be aligned with lane delimiters such as the center line 190. In other implementations, the markers 105 can be disposed along the solid lines 185a and 185b in addition to or instead of along the center line 190. Furthermore, markers 105 can be utilized in roads ways have more than two traffic lanes, and the markers 105 can be disposed along the roadway in between the lanes of traffic. Furthermore, as will be discussed in further detail below, the markers can be disposed on infrastructure elements of the navigable environment, such as light poles, lane dividers, barriers, sign poles, gantries, and/or other infrastructure elements present in the navigable environment. The markers can also be mounted on poles as will be discussed in further detail below.

Vehicle 110 can be an autonomous or semi-autonomous vehicle. An autonomous vehicle is configured to navigate and travel from one location to another without human input. A semi-autonomous vehicle can be configured to navigate and travel from one location to another without human input or with limited human input. A semi-autonomous vehicle can allow a driver to assume full or partial control over the navigation of the vehicle. The vehicle 110 can be configured to carry passengers and/or goods. The vehicle 110 can be configured to provide a steering console and controls that allows a driver to assume manual control of the vehicle. A driver can be required to utilize vehicles on roadways that do not have the proper infrastructure in place to support autonomous navigation or for emergency situations, such as a failure of the navigation system of the vehicle or other situation requiring that manual control of the vehicle be assumed by a passenger.

The term "marker" as used herein refers to navigation objects that can be placed on or in the road surface, on or in infrastructure elements (such as bridges, signs, walls, utility poles, etc.) around the road, and/or disposed along, around the sides of, and/or above the road. A marker can include one or more of radar reflector(s) that are configured to reflect radar signals emitted by the navigation system of vehicles travelling along the road, one or more LiDAR reflector(s) that are configured to reflect LiDAR signals emitted by the navigation system of vehicles travelling along the road, one or more radio-frequency identification (RFID) tag(s) configured to generate a modulated backscatter signal in response to an interrogation signal emitted by the navigation system of the vehicles travelling along the road, and/or one or more optical reflector(s) configured to reflect light within the spectrum visible to the typical human eye. The optical reflector(s) can be color coded to provide visual clues to a human driver and/or for use in camera-based localization techniques. The various examples illustrated in the figures and discussed in the disclosure provide examples of marker that can include one or more of these elements. One or more reflectors can be collocated on the same marker, and one or more types of reflectors can be collocated on the same marker.

The markers 105 can be disposed on poles disposed along the sides of the roadway 180. The markers 105 can also be disposed on elements of existing infrastructure, such as road signs, bridges, utility poles, traffic signals, buildings, dividing walls, or other existing infrastructure elements. The markers 105 can include a reflector that is reflective to radar and/or LiDAR signals transmitted by the navigation system of a vehicle 110. The markers 105 can disposed along the surface of the road and can be integrated into a reflector that is reflective to radar and/or LiDAR signals. The markers 105 can be applied to or embedded into the road surface. The markers 105 can be implemented in addition to or instead of visible light reflectors that reflect visible light are used to demarcate and to enhance the visibility of travel lanes and other elements of a roadway to assist drivers in low light situations. Other elements that can be demarcated on roadways include but are not limited to bike lanes, pedestrian lanes, crosswalks, parking spaces, and/or other elements. These elements can be vary depending upon the driving laws in the location in which the roadway is located.

At least a portion of the markers 105 can include a radio-frequency identification (RFID) tag. The RFID tags can be passive, passive battery-assisted, or active tags. Active tags include a power sources and can be configured to periodically broadcast tag identification information or to wait for an interrogation signal from a tag reader before transmitting the tag identification information. Passive battery-assisted tags can operate similarly to the latter configuration of the active tags by waiting for an interrogation signal from a tag reader before transmitting the tag identification information. The passive battery-assisted tags include a battery or other power source onboard and transmits the tag identification information responsive to receiving an interrogation system from a tag reader. Passive tags do not include an onboard power source and instead rely on the radiofrequency energy transmitted by the tag reader to power the passive tag to transmit the tag identification information. The tag identification information can include a tag identifier that provides a unique identifier for the tag and/or geographical coordinates associated with the marker on which the tag is disposed and information related to expected markers ahead in which can be used by the navigation system to keep the vehicle tracking (used for initial localization and is used periodically, e.g. every time the vehicle travels a predetermined distance, in order to assure that the vehicle keeps tracking upon the markers map and road map and do not accumulate errors). The tag identification information can be stored in persistent memory of the tag. The persistent memory can, at least in part, be writeable or rewritable such that information can be written to the memory. The tag identifier can be generated and associated with the tag at the time that the tag is manufactured and can be stored in a read-only portion of the memory. The geographic coordinates can be written to the tag at the time that the tag is placed on the marker. A global navigation satellite system (GNSS) receiver or other means for determining the geographic coordinates of the marker on which the tag is disposed can be determined, and the geographic coordinates can be written to the tag. In some implementations, the geographic coordinates can be written to a write-once portion of memory to prevent tampering with the geographic coordinate information once the tag has been deployed on a marker. A malicious party can otherwise be able to alter or delete the information stored on the tag, which would cause vehicles relying on the tag identification information to miscalculate their locations or no longer be able to rely on the tags for geographical location information.

Markers similar to those of markers 105 discussed above can be used in alternative implementations in which an autonomous or semi-autonomous vehicle or other machine can be configured to navigate an indoor and/or outdoor venue. The markers can be disposed along hallways, passageways, walls, floors, ceilings, and/or other portions of indoor and/or outdoor venue to assist autonomous or semi-autonomous vehicles or other machines to navigate through the indoor and/or outdoor venue. The markers in such implementations can also utilize the spacing patterns and/or color coding patterns discussed below to assist in navigation through the environment.

Figure 1B:
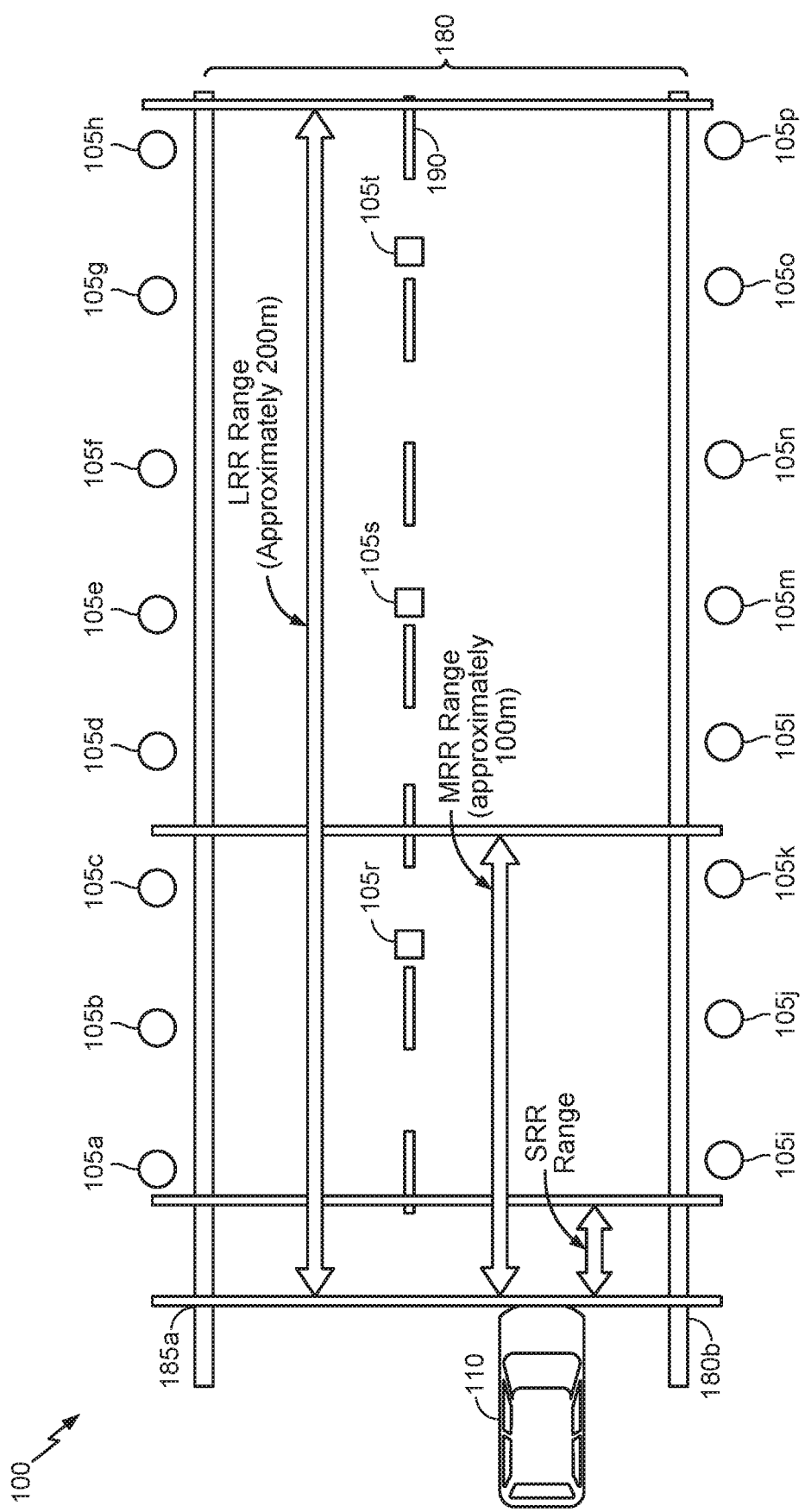
FIG. 1B illustrates a block diagram of the example operating environment from FIG. 1A in which example ranges of the vehicle radar systems have been overlaid.

FIG. 1B illustrates a block diagram of the example operating environment 100 from FIG. 1A in which example ranges of the vehicle radar systems have been overlaid. In the example implementation illustrated in FIG. 1B, the vehicle radar system comprises three radar transceivers: a short-range radar (SRR) transceiver, a mid-range radar (MRR) transceiver, and a long-range radar (LRR) transceiver. As can be seen in the example illustrated in FIG. 1B, each of these radar transceivers can be configured to provide coverage over a portion range of the roadway or other navigable element of the navigable environment which the vehicle 110 is traversing. For example, the SRR transceiver can have a range of approximately 30 meters, the MRR can have a range of approximately 100 meters, and the LRR can have a range of approximately 200 meters. In an example implementation, the LRR can have a frequency range of approximate 76-77 GHz with a center frequency of 76.5 GHz, a bandwidth of approximately 600 MHz, a peak equivalent isotropically radiated power (EIRP) of 55 dBm (decibels relative to a milliWatt), a range of approximately 200 meters maximum, and a ranging accuracy of approximately 50 centimeters. The MRR can have a frequency range of approximate 77-81 GHz with a center frequency of 79 GHz, a bandwidth of approximately 4 GHz, a range of approximately 100 meters maximum, and a ranging accuracy of approximately 7.5 centimeters combination of ranges provided by the SRR, MRR, and LRR transceivers. The actual ranges and frequencies utilized by each of the transceivers can vary based on the implementation, and the ranges and frequencies discussed herein with respect to FIG. 1B are merely examples and are not intended to limit the techniques disclosed herein to these specific ranges and frequencies.

The SRR is typically used for short-range tasks, such as but not limited to detecting the presence of other vehicles in the blind spots of the vehicle 110, detecting cross-traffic, and/or providing a rear-collision warning. The range of the SRR can be too short to be effectively used for the vehicle localization techniques disclosed herein. The MRR can be utilized for some of the same tasks as the SRR, such as but not limited detecting the presence of other vehicles in the blind spots of the vehicle 110 and detecting cross-traffic. The LRR can be used for various tasks, such as adaptive cruise control that can detect the presence of other vehicles or objects in front of the vehicle 110. The MRR and the LRR have a longer effective range and can be utilized by various techniques disclosed herein, such as but not limited to lane tracking and vehicle localization. The MRR and LRR can be particularly effective in situations where the LiDAR and/or camera systems of the vehicle are impacted by weather conditions, such as rain, fog, and snow which can severely degrade the performance of the camera and the LiDAR systems.

At least a portion of the markers 105 can be radar-reflective markers and can include an RFID tag. The RFID can be mounted on a millimeter wave antenna and can be placed with a pole as a marker proximate the road. The RFID tags can be millimeter wave (RFID MMID) tags configured to emit a response to an interrogation signal in the millimeter wave range of the frequency spectrum –30 GHz to 300 GHz and can have a wavelength ranging from 1 millimeter to 10 millimeters. The use of RFID MMID tags is advantageous in autonomous vehicle navigation systems because the vehicle radar system can be adapted to receive modulated millimeter wave signals from RFID MMID tags and use this information in determining a location the vehicle and for navigation of the vehicle along the roadway. The backscatter from the RFID MMID tags can be received by the vehicle radar system and the backscatter signal can be demodulated by the radar transceiver to obtain the tag identification information provided by the RFID MMID tags that can include specific road information (such as road conditions) and information related to markers ahead needed for navigation. The navigation system of the vehicle can use one or more signals reflected from the markers 105 in addition to any tag identification information received from one or more RFID MMID tags disposed on the markers 105 to determine a set of possible locations of the vehicle 110. The navigation system can then compare the one or more estimated locations where the vehicle 110 may be located to a map of the road system to eliminate hypotheses that would place the vehicle 110 off of the road.

Figure 12A:
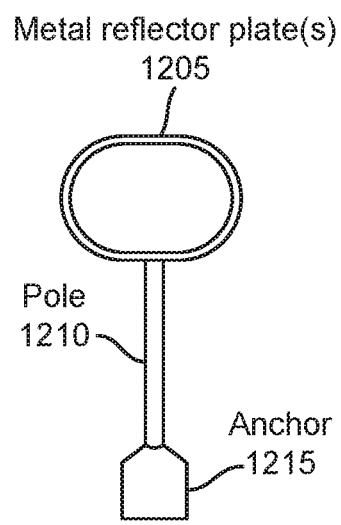
FIGS. 12A, 12B, 12C, and 12D illustrate example markers, reflectors, and RFID/MMID backscattering transponder(s) according to the disclosure.
Figure 12B:
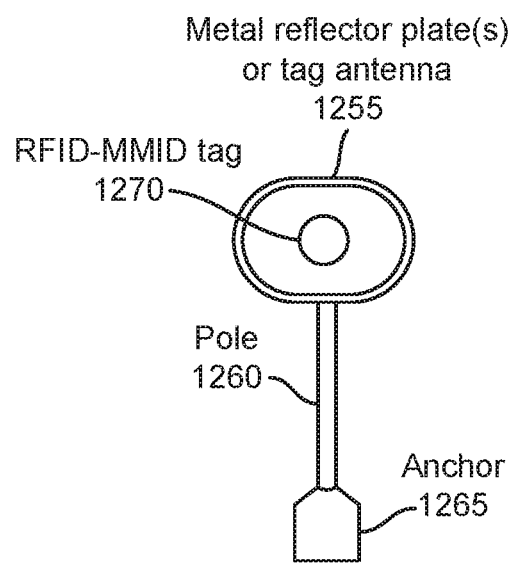

FIGS. 12A and 12B illustrate example markers that can be used to implement the markers 105 illustrated in FIGS. 1A and 1B and can be used to implement the markers of the various processes disclosed herein. However, the techniques disclosed herein are not limited to the specific examples illustrated in FIGS. 12A and 12B. FIG. 12A illustrates an example marker that comprises one or more metal reflective plates 1205 disposed on a pole 1210 that can be anchored with anchor 1215 in the ground along a roadway. The metal reflective plate(s) 1205 are configured to reflect radar signals transmitted by the radar transceiver of the navigation system of the vehicle 110. Similar markers can be utilized for navigating indoor and/or outdoor venues.

FIG. 12B illustrates another example implementation of markers that are similar to those illustrated in FIG. 12A. The marker includes reflector plate(s) 1255 which are similar to the reflector plate(s) illustrated in the preceding figure. The marker also includes pole 1260 for supporting the reflector plate(s) 1255 and an anchor for anchoring the marker in the ground along the roadway or other navigable route. The example marker illustrated in FIG. 12B includes an RFID-MMID tag that is configured to respond to an interrogation signal from the navigation system of the vehicle 110 and to return a backscatter signal that the navigation system can process. The RFID-MMID tag can be configured to return a modulated backscatter signal that includes tag information, such as a tag identifier and/or geographical coordinates to the marker on which the tag is disposed.

While the example markers illustrated in FIGS. 12A and 12B include a pole for mounting the markers, implementations of the marker can omit the pole, and the marker can instead be disposed on or in walls, floors, ceilings, and/or other infrastructure elements of a navigable environment. Alternative implementations of the markers illustrated in FIGS. 12A and 12B can comprise means for anchoring the metal reflective plate portion (with or without a RFID-MMID tag) onto existing infrastructure, such as road signs, walls, bridges, utility poles, etc. rather than anchoring the markers directly into the ground along the road. Furthermore, in some implementations, the markers illustrated in FIGS. 12A and 12B can include reflective elements (such as plates) that are configured to reflect laser light emitted by LiDAR system in addition to or instead of the radar reflective plates 1205 and 1255 illustrated in FIGS. 12A and 12B.

Figure 12C:
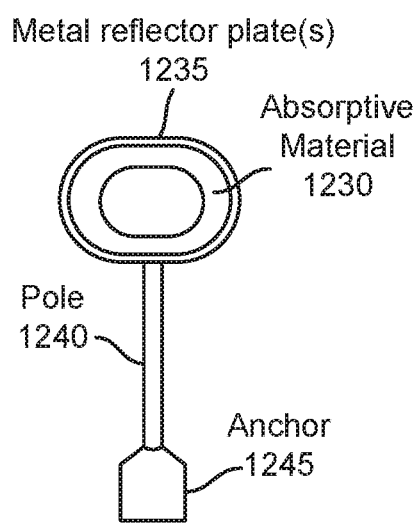
Figure 12D:
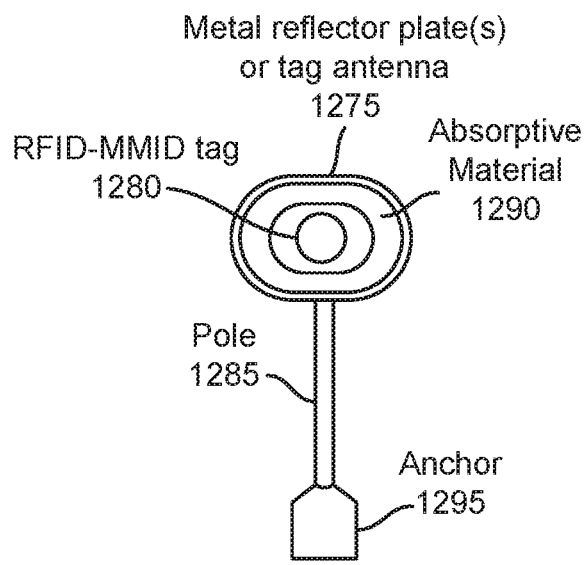

FIGS. 12C and 12D illustrate example markers that can be used to implement the markers 105 illustrated in FIGS. 1A and 1B and can be used to implement the markers of the various processes disclosed herein. However, the techniques disclosed herein are not limited to the specific examples illustrated in FIGS. 12C and 12D. FIG. 12C illustrates an example marker that comprises one or more metal reflective plates 1235 disposed on a pole 1240 that can be anchored with anchor 1245 in the ground along a roadway or other navigable route that is similar to that of marker 1205 illustrated in FIG. 12A. The metal reflective plate(s) 1235 are configured to reflect radar signals transmitted by the radar transceiver of the navigation system of the vehicle 110. The marker illustrated in FIG. 12A includes an absorptive material 1230 that is disposed around a reflective portion of the metal reflective plate 1235. The inclusion of the absorptive material 1230 around a portion of the reflective place 1235 can facilitate detection of reflected radar signals by producing a sharp peak when radar signals reflected off of the marker are processed by the navigation system of the vehicle.

FIG. 12D illustrates another example implementation of markers that are similar to those illustrated in FIG. 12B. The marker includes reflector plate(s) 1275 which are similar to the reflector plate(s) illustrated in the preceding figures. The marker also includes pole 1285 for supporting the reflector plate(s) 1275 and an anchor for anchoring the marker in the ground along the roadway or other navigable route. The example marker illustrated in FIG. 12B includes an RFID-MMID tag that is configured to respond to an interrogation signal from the navigation system of the vehicle 110 and to return a backscatter signal that the navigation system can process. The RFID-MMID tag can be configured to return a modulated backscatter signal that includes tag information, such as a tag identifier and/or geographical coordinates to the marker on which the tag is disposed. The marker illustrated in FIG. 12B also includes an absorptive material 1230 that is disposed around a portion of the metal reflective plate 1275 and the RFID-MMID tag 1280.

While the example markers illustrated in FIGS. 12C and 12D include materials that are absorptive of radar signals, materials that are absorptive of the laser signals used by the LiDAR transceiver of the navigation system of a vehicle can also be used instead of or in addition to radar absorptive materials. Some implementations can include materials that are capable of absorbing both radar signals and laser signals utilized by the navigation system of the vehicle 110. Furthermore, the use of such absorptive materials is not limited to the specific marker configurations illustrated in FIGS. 12C and 12D. Such materials can be used with the other types of markers disclosed herein.

Figure 14:
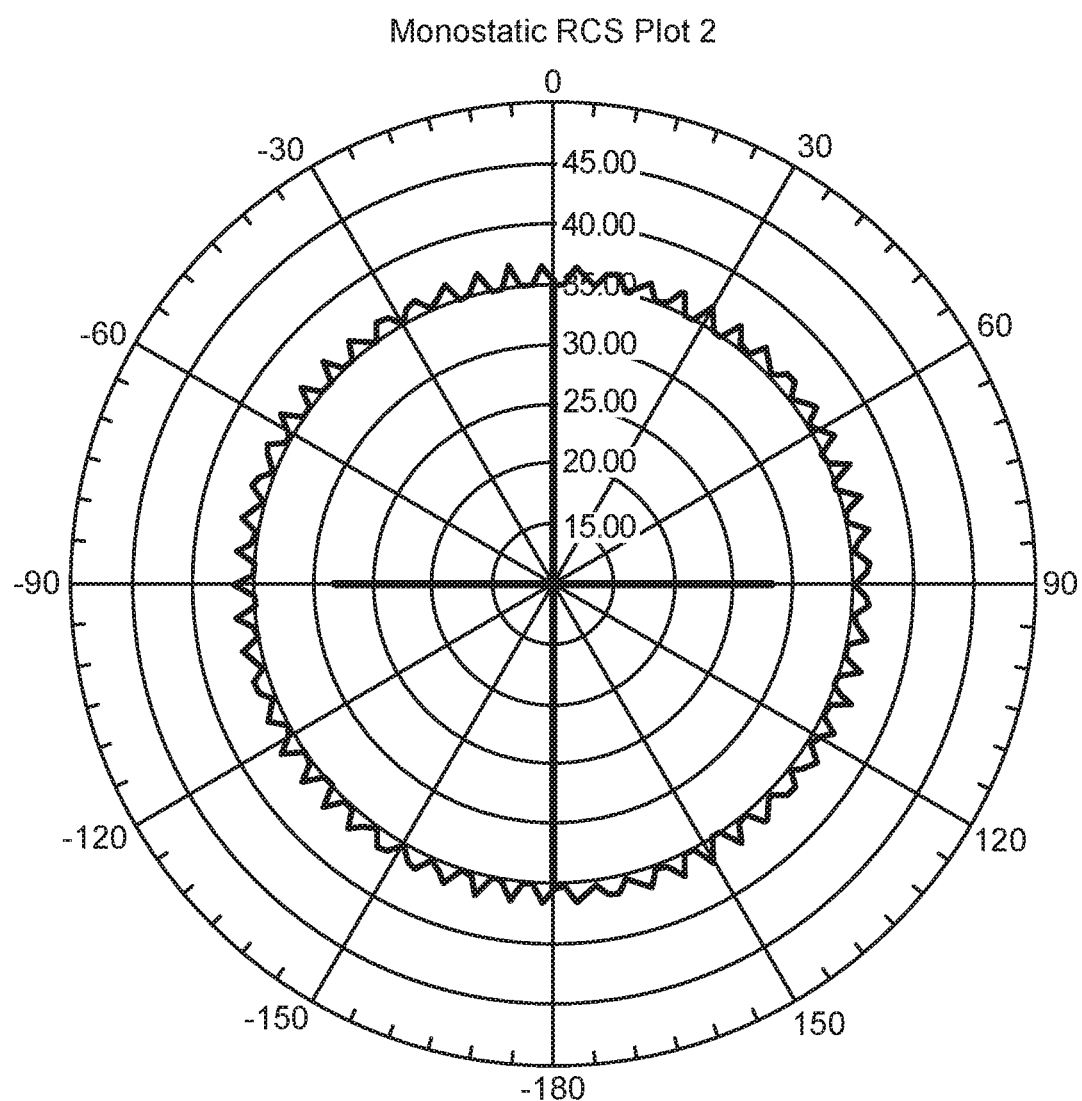
FIG. 14 illustrates an example radar cross section of a pole according to the disclosure.

In some implementations, existing infrastructure elements can be used as markers instead of or in addition to reflective markers being disposed on these infrastructure elements as discussed above. For example, traffic poles, lamp poles, poles holding signage, and/or other such infrastructure elements including but not limited to these examples can have a high radar cross section (RCS). Such infrastructure elements can provide large radar reflections that can be used in addition to and/or instead of the light-reflective and/or radar-reflective markers discussed above to determine a location solution for a vehicle. FIG. 14 illustrates an example radar cross section of a pole according, which illustrates how such an infrastructure element could have a high RCS that can be detected using the LRR and/or MRR of the vehicle navigation system. However, as illustrated in the table of FIG. 15, the closer that the vehicle is to the pole or other infrastructure element, the greater the spreading error associated with the pole. The table includes the distance that the vehicle is from the top and the bottom of the pole, the height of the pole, and the spreading error associated with each distance. As the distance between the vehicle and the infrastructure element increases, the spreading error can become negligible. The radar ranging error might be added to the pole spreading error. LRR ranging error is ~0.5 meter (when using BW=600 MHz) and the MRR can have an approximately 7.5-centimeter accuracy (uses BW=4 GHz). At short distance (below 100 meters), the spreading error might be almost identical to the LRR ranging error.

Accordingly, infrastructure elements can serve as coarse-resolution markers that can be used by the navigation system to determine a location solution for the vehicle. The location of such infrastructure elements can be identified and included in marker map information generated using the techniques disclosed herein and discussed in detail below. The marker map information can include both coarse-resolution markers and fine-resolution markers (such as the radar-reflective markers, light-reflective markers, and/or MMID-RFID markers discussed above with respect to at least FIGS. 1A, 1B, 4A-C, 6A-E). Fine-resolution markers can be disposed on various infrastructure elements as discussed herein, such as but not limited to concrete and/or metal barriers and can be used to provide fine localization accuracy while the coarse-resolution markers can be used to provide a coarser localization accuracy.

The navigation system of the vehicle can be configured to perform a two-stage localization process that includes performing in parallel: (1) using LRR to determine a coarse localization for the vehicle using markers that are farther from the vehicle (e.g., up to ~200 meters), and (2) using MRR or SRR to perform fine-resolution localization based on resolutions coming from fine-resolution markers that are a short or mid-range from the vehicle (e.g., up to 100 meters). In the event that the mid-range localization receives only two reflections, the MRR-based (or SRR-based) localization will suffer from ambiguity in determining a localization solution resulting in multiple possible localization solutions. The vehicle navigation system can be configured to resolve this ambiguity by selecting a localization solution from the multiple localization solutions that falls within the coarse localization range determined using the LRR and also falls along a navigable area, such a roadway, based on map information for the navigable environment. In that way, fine localization resolution can be achieved based on MRR radar measurements of time-of-flight (TOF) for which reflections from one two markers is available rather than the at least three reflections from markers and above that are needed to determine a trilateration solution for the location of the vehicle.

Navigation data comprising a map of marker locations can be created using various techniques. The map of the marker locations can be generated from plans of marker locations to be placed on the roadway, can be generated as the markers are placed on the road, and/or can be generated by driving vehicles along the road once the markers are in place to generate the map data. The map location can include marker information that identifies the location of the markers 105 within the navigable environment. The marker information included in the navigation data can include information such as geographical coordinates of the markers, height at which the markers are located relative to the road surface, type of marker (radar-reflective, light-reflective, MMID, optical reflective, or a combination of one or more of types), and/or other information. The type of marker information can also identify coarse-resolution markers can be radar-reflective infrastructure elements, such as but not limited to lamp posts, traffic poles, sign supports, etc., that have a radar cross section that can be detected by a radar transceiver of the navigation system of the vehicle.

The tag identifiers associated with any RFID tags that are disposed on at least a portion of the markers 105 can also be included with the location information for the markers. The tag identifiers can be associated with a set of geographic coordinates where the marker on which the tag is disposed is located. The navigation system of a vehicle receiving a backscatter signal from such a tag can determine how far the vehicle is from the marker on which the tag is disposed based on time of flight (TOF) information. The map of the marker locations can also include markers that do not have an RFID tag disposed on the markers. The marker information included in the map information can indicate the marker includes one or more radar reflectors, one or more LiDAR reflectors, one or more optical reflectors, or a combination thereof.

As will be discussed in greater detail below, LiDAR can be used to generate more accurate radar reflector maps according to the techniques disclosed herein. An example process for utilizing LiDAR to generate radar reflector locations is illustrated in FIGS. 10 and 11. In clear weather conditions, LiDAR can provide high accuracy localization of the vehicle 110, which can in turn be used to accurately determine the locations of radar reflectors detected by the radar transceiver of the vehicle.

The marker location information and the map information can also be maintained via crowdsourcing techniques in which the navigation systems, such as the one of vehicle 110 or other autonomous or semi-autonomous machines implementing the techniques disclosed herein, can report errors in the marker location information or the map information to a navigation server (not shown). The navigation systems can also be configured to report malfunctioning markers to the navigation server and markers that are not located at the location at which they are expected to be located. The navigation systems can be configured to report this information to the navigation server via a wireless network connection, such as a V2X (vehicle-to-everything communication), WAN or WLAN connection. The navigation system of the vehicle can also be configured to download marker map updates and/or road map updates (or updates to maps of other types of navigable environments) via such a wireless connection.

The navigation server can be maintained by a trusted entity responsible for maintaining marker location information and the map information that can be used by the navigation system. The marker location information and the map information can be downloadable from the navigation server by the navigation system via wireless network connection. The navigation server can be configured to push a notification out to navigation systems subscribed to such updates that indicates when updated marker location information and/or map information is available. In yet other implementations, the navigation system can be configured to contact the navigation server to check for updates periodically or upon demand of a user of the navigation system.

The navigation server be configured to maintain marker location information and maintain map information for roadways and/or navigable portions of indoor and/or outdoor venues. The navigation server can be configured to receive error reports regarding missing, malfunctioning, or damaged markers. The navigation server can be configured to update the marker location information and/or the map information responsive to receiving a threshold number of error reports from navigation systems utilizing this information, and to update the marker location information and/or the map information responsive to such reports. The navigation systems can be configured to utilize encryption and/or other techniques to prevent malicious parties from spoofing or forging error reports to cause the marker location information and/or map information to be altered. Furthermore, the navigation server can be configured to alert an administrator before making automated changes to the marker location information and/or the map information. The administrator can review the proposed changes to the marker location information and/or the map information and can approve or deny the changes. The navigation server can also be configured to generate a repair request to dispatch someone to repair or replace missing, malfunctioning, or damaged markers responsive to receiving more than a threshold number of error reports regarding a particular marker.

In some implementations, the markers can be disposed along or proximate to the roadway in a known and predefined coded pattern in which the spacings between the markers are uneven. The navigation system of a vehicle receiving a reflected signal from a group of three or four consecutive poles along the roadway can accurately determine a location of the vehicle along the roadway. The navigation system can use the reflected signals in addition to any RFID backscatter signals from RFID tagged poles to determine a set of hypotheses as to the location of the vehicle by comparing time of flight (TOF) information for the reflected signals with marker map information to determine one or more estimated locations where the vehicle may be located. The navigation system can compare these hypotheses to road map information to eliminate non-relevant hypotheses that would place the vehicle off of a roadway to determine an accurate location for the vehicle (also referred to herein as a "refined location" for the vehicle). In implementations where these techniques are applied to navigation through an indoor and/or outdoor venue, the map information can be for the indoor and/or outdoor venue and can be used to eliminate location hypotheses that fall outside of the navigable areas of the indoor and/or outdoor venue.

Figure 2:
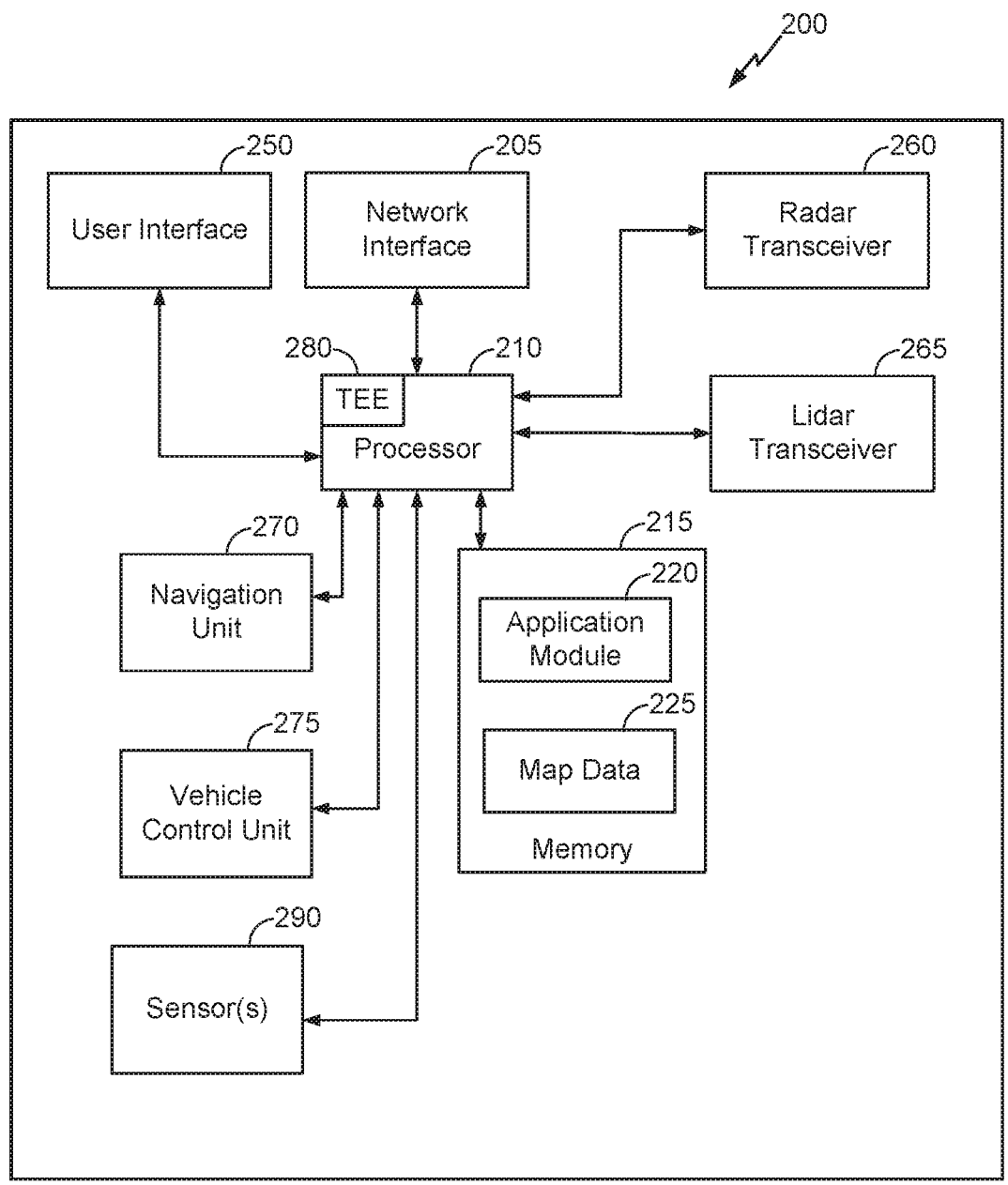
FIG. 2 is a functional block diagram of an example computing device that can be used to implement the navigational and driving control systems of the vehicle illustrated in FIGS. 1A and 1B.

FIG. 2 is a functional block diagram of an example computing device 200 that can be used to implement the navigational and/or driving control systems of the vehicle 110 illustrated in FIGS. 1A and 1B. Such a computing device 200 can alternatively be used as a navigational and control system for other types of autonomous or semi-autonomous devices as discussed above. The computing device 200 can be an in-vehicle computer system that can provide network connectivity for downloading network content and application, navigational data, and/or other content that can be viewed or executed using the computing device 200. For the sake of simplicity, the various features/components/functions illustrated in the schematic boxes of FIG. 2 are connected together using a common bus to represent that these various features/components/functions are operatively coupled together. Other connections, mechanisms, features, functions, or the like, can be provided and adapted as necessary to operatively couple and configure a navigational and driving control system. Furthermore, one or more of the features or functions illustrated in the example of FIG. 2 can be further subdivided, or two or more of the features or functions illustrated in FIG. 2 can be combined. Additionally, one or more of the features or functions illustrated in FIG. 2 can be excluded.

As shown, the computing device 200 can include a network interface 205 that can be configured to provide wired and/or wireless network connectivity to the computing device 200. The network interface can include one or more local area network transceivers that can be connected to one or more antennas (not shown). The one or more local area network transceivers comprise suitable devices, circuits, hardware, and/or software for communicating with and/or detecting signals to/from one or more of the wireless local-area network (WLAN) access points, and/or directly with other wireless devices within a network. The network interface 205 can also include, in some implementations, one or more wide area network (WAN) transceiver(s) that can be connected to the one or more antennas (not shown). The wide area network transceiver can comprise suitable devices, circuits, hardware, and/or software for communicating with and/or detecting signals from one or more of, for example, the wireless wide-area network (WWAN) access points and/or directly with other wireless devices within a network. The network interface can include a V2X communication means for communicating with other V2X capable entities. The WLAN transceiver of the computing device can be configured to provide the V2X communication means. The navigation unit of the computing device can be configured to collect marker information, including malfunctioning marker information, and to provide the marker information to a navigation server responsive to identifying a missing, malfunctioning, or damaged marker. The network interface 205 is optional any cannot be included in some implementations of the computing device 200.

The network interface 205 can also include, in some implementations, an SPS receiver (also referred to as a global navigation satellite system (GNSS) receiver). The SPS receiver can be connected to the one or more antennas (not shown) for receiving satellite signals. The SPS receiver can comprise any suitable hardware and/or software for receiving and processing SPS signals. The SPS receiver can request information as appropriate from the other systems and can perform the computations necessary to determine the position of the computing device 200 using, in part, measurements obtained by any suitable SPS procedure. The positioning information received from the SPS receiver can be provided to the navigation unit 270 for determining a location of the vehicle 110 and for navigating the vehicle 110 along a roadway or other navigable area.

The processor(s) (also referred to as a controller) 210 can be connected to the memory 215, the navigation unit 270, the vehicle control unit 275, the user interface 250, the network interface 205, the radar transceiver 260, and the LiDAR transceiver 265. The processor can include one or more microprocessors, microcontrollers, and/or digital signal processors that provide processing functions, as well as other calculation and control functionality. The processor 210 can be coupled to storage media (e.g., memory) 215 for storing data and software instructions for executing programmed functionality within the computing device. The memory 215 can be on-board the processor 210 (e.g., within the same IC package), and/or the memory can be external memory to the processor and functionally coupled over a data bus.

A number of software modules and data tables can reside in memory 215 and can be utilized by the processor 210 in order to manage, create, and/or remove content from the computing device 200 and/or perform device control functionality. As illustrated in FIG. 2, in some embodiments, the memory 215 can include an application module 220 which can implement one or more applications. It is to be noted that the functionality of the modules and/or data structures can be combined, separated, and/or be structured in different ways depending upon the implementation of the computing device 200. The application module 220 can comprise one or more trusted applications that can be executed by the trusted execution environment 280 of the computing device 200.

The application module 220 can be a process or thread running on the processor 210 of the computing device 200, which can request data from one or more other modules (not shown) of the computing device 200. Applications typically run within an upper layer of the software architectures and can be implemented in a rich execution environment of the computing device 200, and can include navigation applications, games, shopping applications, content streaming applications, web browsers, location aware service applications, etc.

The processor 210 can include a trusted execution environment 280. The trusted execution environment 280 can be used to implement a secure processing environment for executing secure software applications. The trusted execution environment 280 can be implemented as a secure area of the processor 210 that can be used to process and store sensitive data in an environment that is segregated from the rich execution environment in which the operating system and/or applications (such as those of the application module 220) can be executed. The trusted execution environment 280 can be configured to execute trusted applications that provide end-to-end security for sensitive data by enforcing confidentiality, integrity, and protection of the sensitive data stored therein. The trusted execution environment 280 can be used to store encryption keys, vehicle configuration and control information, navigation information for use in autonomous driving, and/or other sensitive data.

The computing device 200 can further include a user interface 250 providing suitable interface systems for outputting audio and/visual content, and for facilitating user interaction with the computing device 200. For example, the user interface 250 can comprise one or more of a microphone and/or a speaker for outputting audio content and for receiving audio input, a keypad and/or a touchscreen for receiving user inputs, and a display (which can be separate from the touchscreen or be the touchscreen) for displaying visual content.

The radar transceiver 260 can be configured to transmit radar signals from the vehicle 110 and to receive reflected radar signals reflected by reflectors, such as the reflectors 105. The radar receiver 260 can also be configured to receive backscattered signals from RFID MMID tags embedded in one or more of the reflectors 105, and to demodulate the transmitter identification information included in the backscattered signals received from the RFID MMID tags. The radar receiver 260 can be configured to provide ranging information (e.g. distance of the vehicle 110 from one or more markers) to the navigation unit 270. The radar receiver 260 can also be configured to provide transmitter identification information from any RFID MMID tags to the navigation unit 270. The radar transceiver 260 can also be used to identify objects proximate to the vehicle 110 that may obstruct the vehicle and/or pose a collision hazard, such as but not limited to pedestrians, objects in the roadway, and/or other vehicles on the roadway. The radar transceiver 260 can provide object detection information to the navigation unit 270.

While the computing device 200 illustrated in FIG. 2 includes a single radar transceiver 260, the computing device 200 can actually comprise more than one radar transceiver. For example, the computing device can comprise a short-range radar (SRR) transceiver, a mid-range radar (MRR) transceiver, and a long-range radar (LRR) transceiver as discussed above with respect to FIG. 1B. As can be seen in the example illustrated in FIG. 1B, each of these radar transceivers can be configured to provide coverage over a different range of the roadway or other navigable element of the navigable environment which the vehicle 110 is traversing. For example, the SRR transceiver can have a range of approximately 30 meters, the MRR can have a range of approximately 100 meters, and the LRR can have a range of approximately 200 meters. These ranges are merely example of one possible combination of ranges provided by the SRR, MRR, and LRR transceivers. The actual ranges utilized by each of the transceivers can vary based on the implementation.

The computing device 200 can also include a LiDAR transceiver 265. The LiDAR transceiver 265 can be configured to emit a laser signal that can be reflected by reflectors, such as the reflectors 105. The LiDAR transceiver 265 can also be used to identify objects proximate to the vehicle 110 that can obstruct the vehicle and/or pose a collision hazard, such as but not limited to pedestrians, objects in the roadway, and/or other vehicles on the roadway. The LiDAR transceiver 265 can provide object detection information to the navigation unit 270. Furthermore, the LiDAR transceiver 265 can be used to assist in developing a map of the radar reflectors disposed throughout the navigable region as discussed with respect to FIGS. 10 and 11.

The vehicle control unit 275 can be configured to control various components of the vehicle 110 to cause the vehicle to move along a route determined by the navigation unit 270. The vehicle control unit 275 can be configured to be communicatively coupled with the navigation unit 270 and can be configured to receive information from the navigation unit 270 and to provide information to the navigation unit 270. The vehicle control unit 275 can be configured to output signals to one or more components of the vehicle to control acceleration, braking, steering, and/or other actions by the vehicle. The vehicle control unit 275 can also be configured to receive information from one or more components of the vehicle and/or sensors, including the navigation unit 270, that can be used to determine a current state of the vehicle. The current state of the vehicle can include a location of the vehicle, a speed of the vehicle, acceleration of the vehicle, direction of travel of the vehicle, which gear the vehicle is currently configured to operate in, and/or other information regarding the state of the vehicle. In implementations where the navigation system is included in other types of autonomous or semi-autonomous device, a control unit configured to control the autonomous or semi-autonomous device can be substituted for the vehicle control unit 275.

Figure 7:
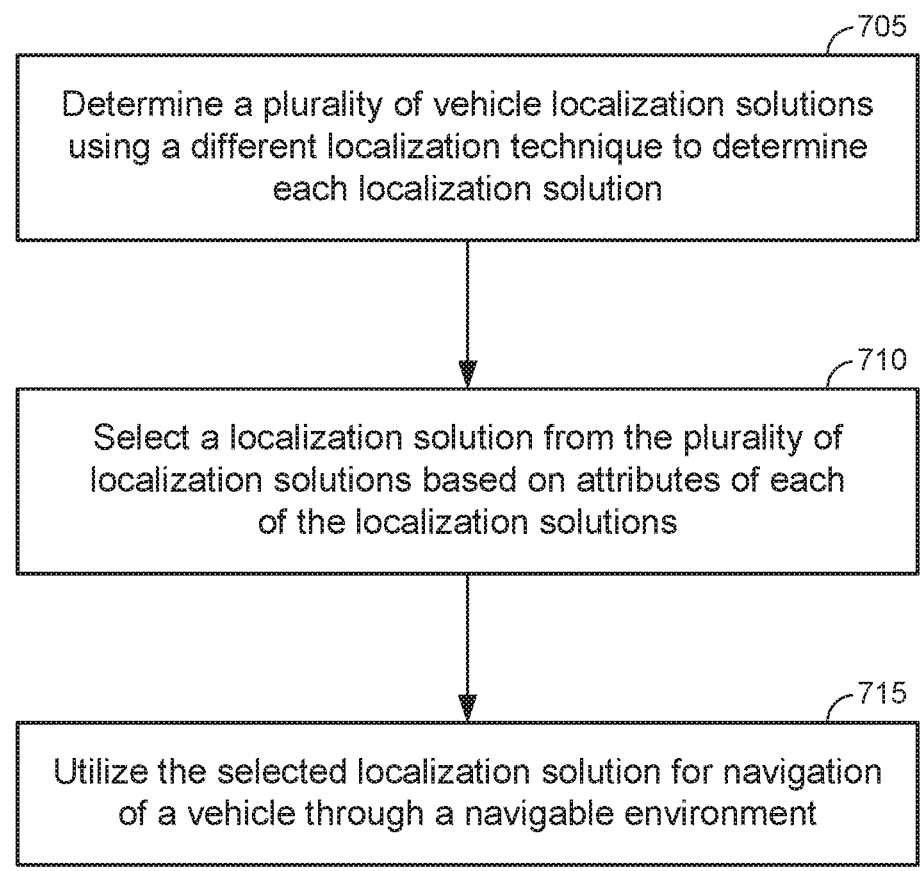
FIG. 7 is a flow diagram of a process for operating a navigation system according to the techniques disclosed herein.
Figure 8:
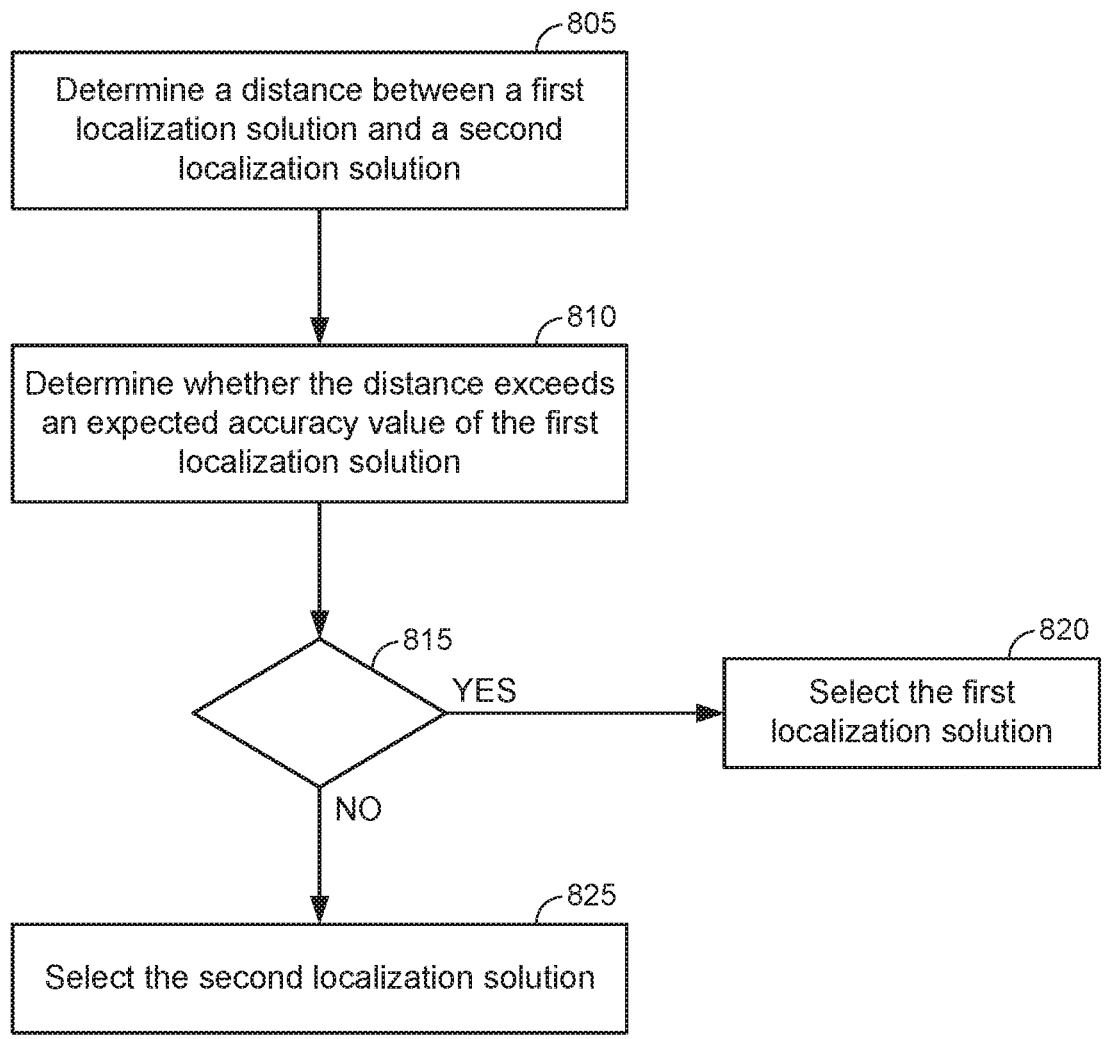
FIG. 8 is a flow diagram of an example process for selecting a localization solution according to the techniques disclosed herein.
Figure 9:
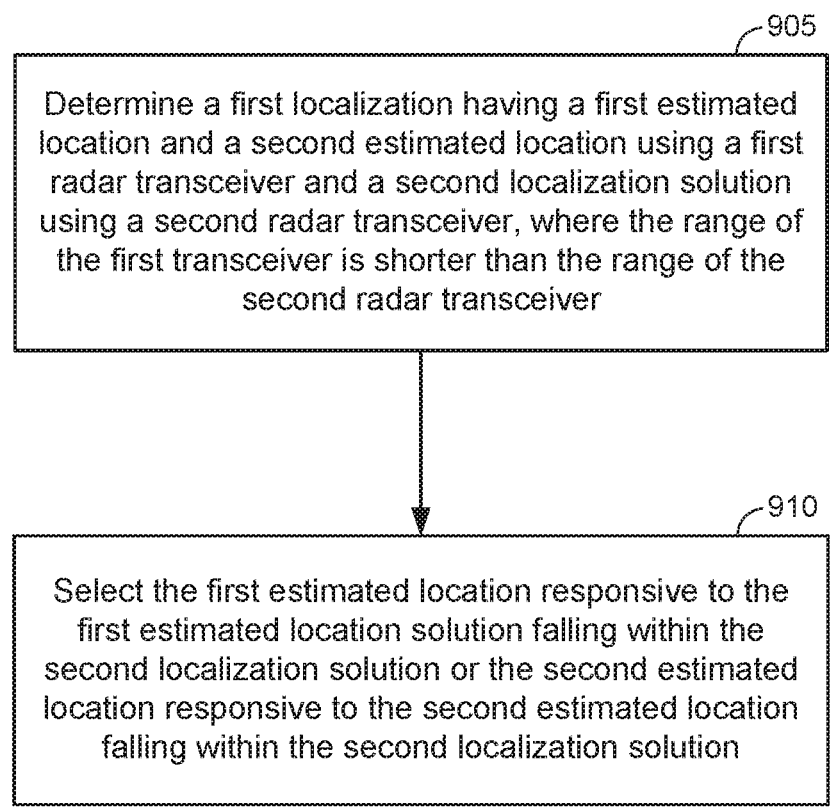
FIG. 9 is a flow diagram of an example process for selecting a localization solution according to the techniques disclosed herein.
Figure 13:
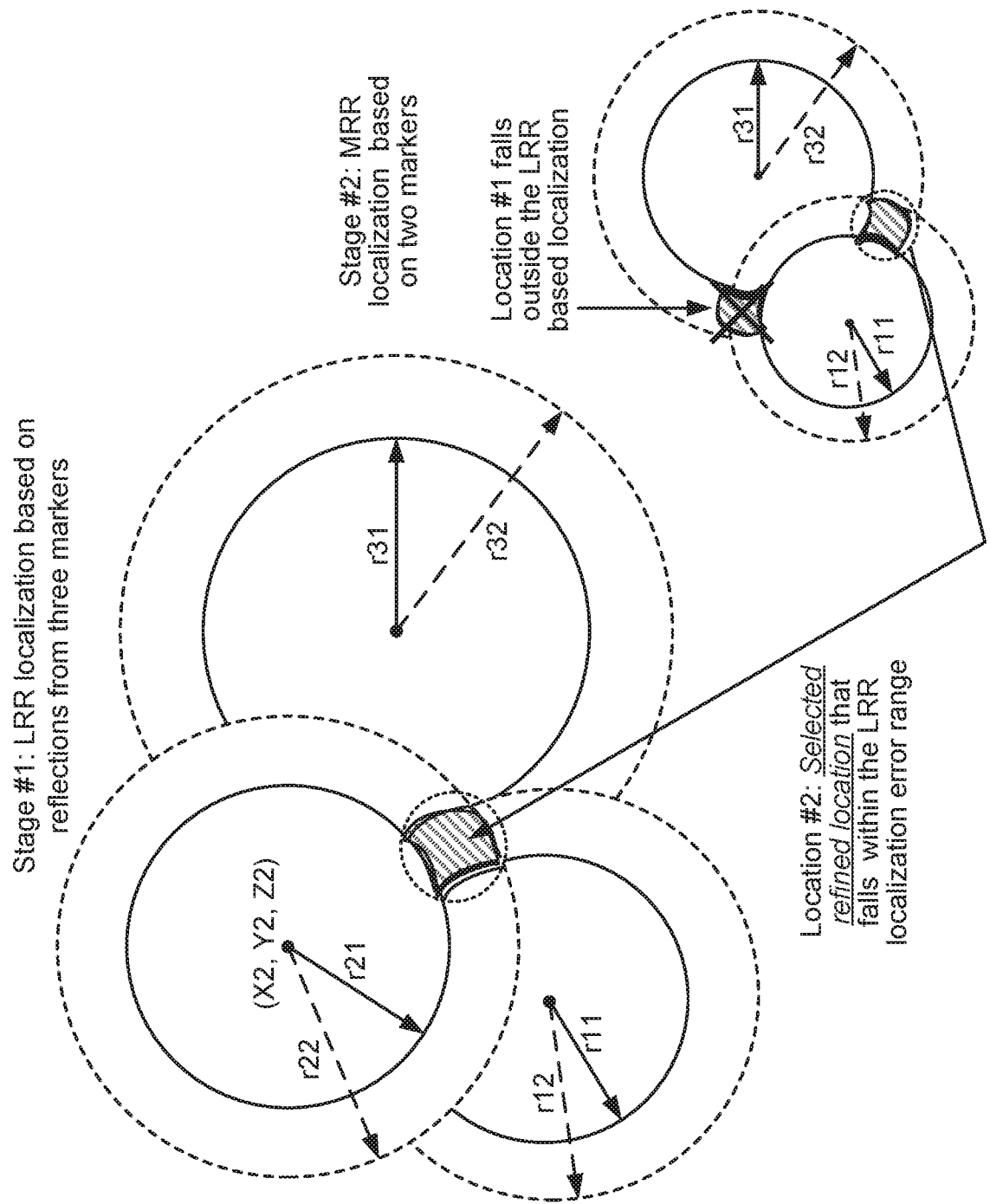
FIG. 13 illustrates an example process for determining a localization solution.
Figure 16:
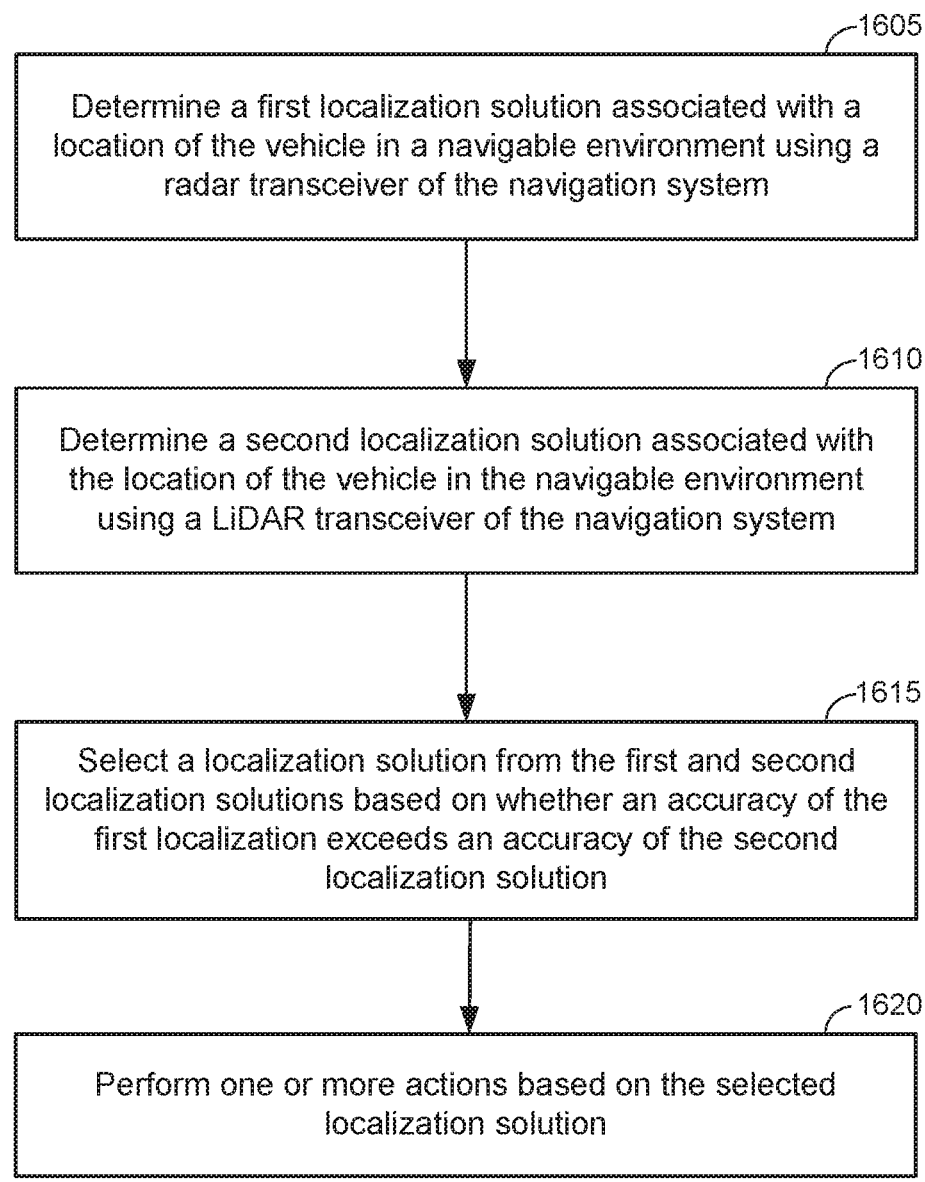
FIG. 16 is a flow diagram of a process for operating a navigation system according to the techniques disclosed herein.
Figure 17:
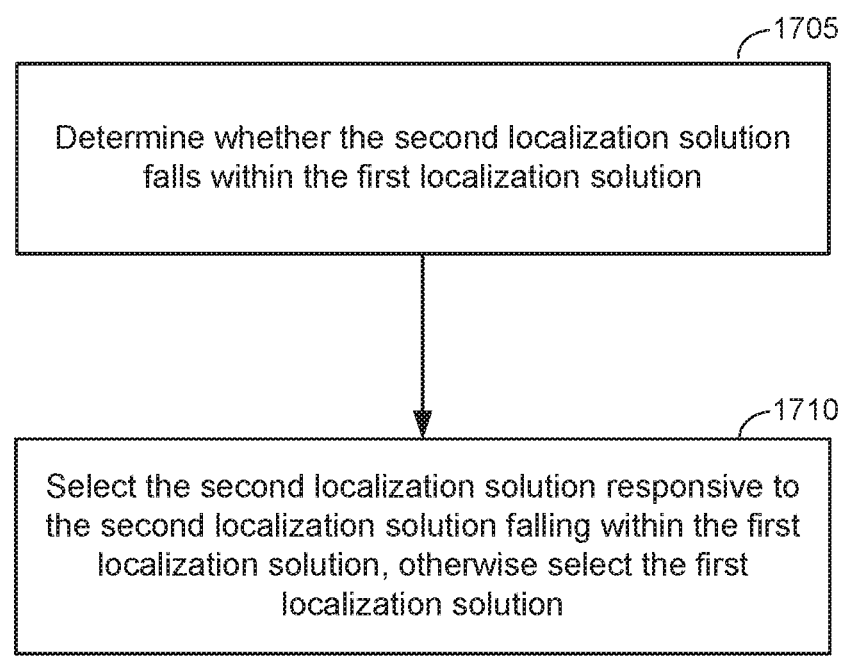
FIG. 17 is a flow diagram of an example process for selecting a localization solution according to the techniques disclosed herein.

The navigation unit 270 can be configured to receive ranging information and tag identification information (where available) from the radar transceiver 260. The navigation unit 270 can also be configured to receive ranging information from the LiDAR transceiver 265, where the computing device 200 includes the LiDAR transceiver 265. In some implementations, the computing device 200 can include both a radar transceiver 260 and a LiDAR transceiver 265, because some roadways can be equipped with markers that a radar reflective and can be used with the radar transceiver 260 and other roadways can be equipped with markers that are laser reflective and can be used with the LiDAR receiver 260. Different jurisdictions may adopt different technologies, and some implementations can be configured to support both radar and LiDAR implementations to allow the vehicle 110 to navigate and drive through areas supporting either or both of these technologies. Furthermore, markers can be color coded, such as with one or more reflectors having different colors placed on the poles. The color coding patterns on sequences of markers and/or on particular markers can be included in the marker map information that the navigation unit of the vehicle can access. The navigation unit can compare the patterns of reflector colors observed with the information included in the marker map information to determine one or more estimated locations for the vehicle. In some implementations, the navigation unit can be configured to utilize a combination of two or more of reflected radar and/or LiDAR signals, marker spacing patterns, backscatter signals from RFID-MMID tags, and marker color coding to come to a localization solution for the vehicle 110. The usage of more than one localization technique can be particularly useful in bad weather conditions which may interfere with one or more of the techniques discussed herein by attenuating reflected and backscatter signals and/or making detection of visual reflector colorations difficult. The navigation unit 270 can be configured to select a localization technique based on the weather conditions and/or on an estimated error associated with each of the various localization techniques. Examples processes for selecting a localization technique are illustrated in FIGS. 7-9. Additional examples are illustrated in FIGS. 13, 16, and 17.

The navigation unit 270 can also be configured to identify missing, malfunctioning, or damaged markers. The navigation unit can be configured to perform a localization procedure according to the techniques disclosed herein to determine a location of the navigation unit 270 (and thus, the vehicle or machine in which the navigation unit is disposed). The navigation unit 270 can use the map information and marker location information to continue to navigate along a roadway or other navigable environment once a location is determined. The navigation unit 270 can use the map information and marker location information to determine which markers the vehicle should be approaching and can use this information to identify missing, malfunctioning, or damaged markers using the techniques discussed above. The navigation unit 270 can send an error report to the navigation server responsive to identifying a missing, malfunctioning, or damaged marker.

The navigation unit 270 and the vehicle control unit 275 can be implemented in hardware, software, or a combination thereof. The navigation unit 270 and the vehicle control unit 275 can be implemented at least in part by software executed by the trusted execution environment 280 to prevent the navigation unit 270 and the vehicle control unit 275 from being tampered with by a malicious third party that wishes to interfere with navigation of the vehicle 110 and/or to assume control of the vehicle 110.

The sensor(s) 290 can comprise one or more sensors that can be used to collect data that can be used to assist in navigation of the vehicle. The sensor(s) 290 can output sensor data that the navigation unit 270 can use in addition to the information received from the network interface 205, the radar receiver 260, and the LiDAR receiver 265. The sensor(s) 290 can include one or more optical sensors, such as still or video cameras, that can be used to capture information about the area surrounding the vehicles, such as lane markings, signage, reflector colorations and/or patterns, the presence of objects and/or other vehicles proximate to the vehicle, and other such information.

Figure 3:
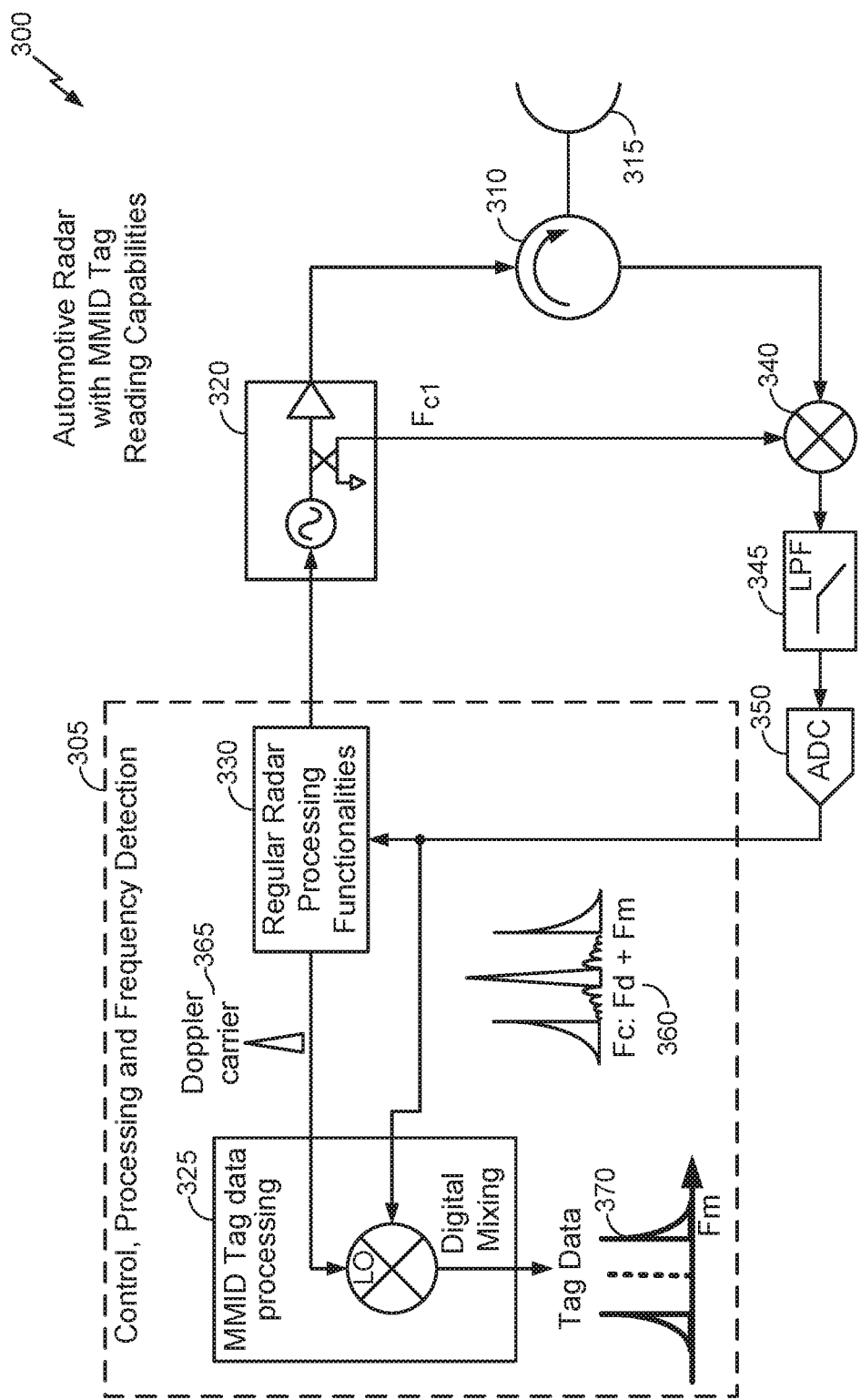
FIG. 3 is a is a functional block diagram of an example radar transceiver that can be used to implement the radar transceiver of the vehicle illustrated in FIGS. 1A and 1B.

FIG. 3 is a is a functional block diagram of a radar transceiver 300 that can be used to implement the radar transceiver of the vehicle 110 illustrated in FIGS. 1A and 1B and the radar transceiver 260 illustrated in FIG. 2. As discussed above, the vehicle 110 can include more than one radar transceiver. In some implementations, the vehicle 110 can include an SRR transceiver, an MRR transceiver, and an LRR transceiver. The radar transceiver 300 is configured to receive radar signals that have been reflected from the markers 105 and to receive backscattered signals from RFID MMID tags that can be embedded in some or all of the markers 105. The RFID MMID can be mounted also as standalone markers that provide information on road conditions (allowed speed, etc.) and information on radar (and or LiDAR) markers ahead needed for the vehicle to keep tracking navigation.

The radar transceiver 300 is configured to perform any regular radar processing functionality associated, with for example, an SRR, MRR, or LRR would typically perform for the vehicle 100. Furthermore, the radar transceiver 300 is not limited to autonomous or semi-autonomous vehicle usage and can alternatively be used as a navigational and control system for other types of autonomous or semi-autonomous machines as discussed above.

The radar transceiver 300 includes a control, processing, and frequency detection unit 305 that includes an MMID data tag processing unit 325 and a radar processing unit 330. The radar transceiver 300 also includes a front-end unit 310. The control, processing, and frequency detection unit 305 can be configured to generate and output a signal to the front-end unit 320. The front-end unit 320 can include an oscillator and an amplifier and output a signal to the circulator 310. The circulator 320 is communicatively coupled to the antenna 315 and the input to the receive path comprising the mixer 340, the low-pass filter (LPF) 345, and the analog-to-digital converter (ADC) 350. The output from the receive path is provided as an input to the MMID tag data processing unit 325 and the radar processing unit 330. The MMID tag data processing unit 325 is configured to demodulate the backscatter signal received from the RFID MMID tags.

The signals received at the antenna 315 can comprise backscatter signals comprising modulated tag data from the RFID MMID tags as well as a reflected radar signal. The combined data can be fed through the receive path of the transceiver 300 to prepare for the separation of the modulated tag data from the reflected radar signal. The combined data is passed through the RF mixer 340 with the transmit frequency utilized by the car radar ($F_{cl}$) as the second input to the mixer. The output from the mixer is passed through the low pass filter 345 and the output of the LPF 345 is input to the ADC 350. The resulting output from the ADC 350 is a combination of the Doppler carrier frequency ($F_d$) of the reflected signals and the frequency of the modulated backscatter signal ($F_m$) represented by signal 360 in FIG. 3. The radar processing unit 330 can determine the Doppler carrier frequency ($F_d$) from the signal 360 and output this frequency as signal 365 to the MMID tag data processing unit 325. The MMID tag data processing unit 325 can input the combined signal 360 and the Doppler carrier frequency 365 into a mixer to isolate the modulated backscatter frequency ($F_m$) of the RFID-MMID tag (represented by signal 370 in FIG. 3). The mixing function of the processing unit 325 can be done either in HW or alternatively in SW using digital signal processing (DSP).

The radar processing unit 330 can be configured to process the reflected radar signals for various radar-related tasks, such as cross-traffic detection, blind-spot detection, adaptive cruise control, and/or other features, that are performed by the particular type of radar (e.g. LRR or MRR) from which the signals have been received. The MMID tag data processing 330 can demodulate the modulated backscatter signal to obtain tag information.

The control, processing, and frequency detection unit 305 can be configured output ranging information and tag identification information (where available) that can be used by the navigation unit 270 of the vehicle to navigate the vehicle along a roadway. The ranging information indicates how far away a marker 105 is from the vehicle at the time that radar signal was transmitted by the radar transceiver 300 and reflected back by the marker 105. The ranging information be determined by calculating a time of flight (TOF) for a radar signal reflected based on the time that radar signal was transmitted by the radar transceiver 300 and the time at which the reflected signal was received at the radar transceiver 300. The tag identification information included in the modulated backscatter signal from RFID MMID tags can also be provided to the navigation unit 270. The tag identification information can include a unique identifier associated with the RFID MMID tag that the navigation unit 270 can look up in a marker map to determine an exact location for the marker. The information provided by the tag can also include information identifying radar markers ahead of the vehicle to support the vehicle tracking along the roadway or other navigable portion of the navigable environment. The information identifying radar markers ahead of the vehicle can be provided in order to avoid accumulation errors associated with location determination and to verify that the vehicle is exactly aligned with the markers map. By using this information and the reflected radar signals from one or more markers 105, the navigation unit 270 can determine one or hypotheses regarding location of the vehicle 110. The navigation unit 270 can compare these hypotheses to road map data to eliminate hypotheses that would place the vehicle off of a roadway. By eliminating these hypotheses, the actual location of the vehicle can be determined. The navigation unit 270 can supplement the information received from the radar transceiver 300 with information received from a GNSS transceiver and/or a LiDAR transceiver where such transceivers are included in the computing system 200 of the vehicle 110. As discussed above, the markers can be disposed along the road in a particular pattern and/or can have color reflectors color coded in a predetermined pattern that can also be used to determine hypothesis for the location of the vehicle. The navigation unit can consider the pattern information in addition to the RFID-MMID tag information when determining the estimated locations of the vehicle 110.

The techniques disclosed herein can utilize various types of RFID-MMID tags. Passive RFID-MMID tags can provide a coverage area of just less than ten meters (meaning that if the tag is more than ten meters from the vehicle emitting the signal that triggers then the radar signal reaching the tag is likely to be insufficient to power the tag to generate the backscatter signal). Semi-passive RFID-MMID tags can provide a slightly greater coverage area. The semi-passive tags include a regulated power supply that is configured to power the tag so that the received signal does not have to be received with sufficient power to power the tag to generate the backscatter signal. Active RFID-MMID tags can have an even greater range. For example, such tags can have a range of approximately 40 meters. Active RFID tags have a power supply and are configured to broadcast a signal periodically without relying on detecting and responding a signal transmitted by the radar transceiver by the navigation system of the vehicle 110.

Figure 4A:
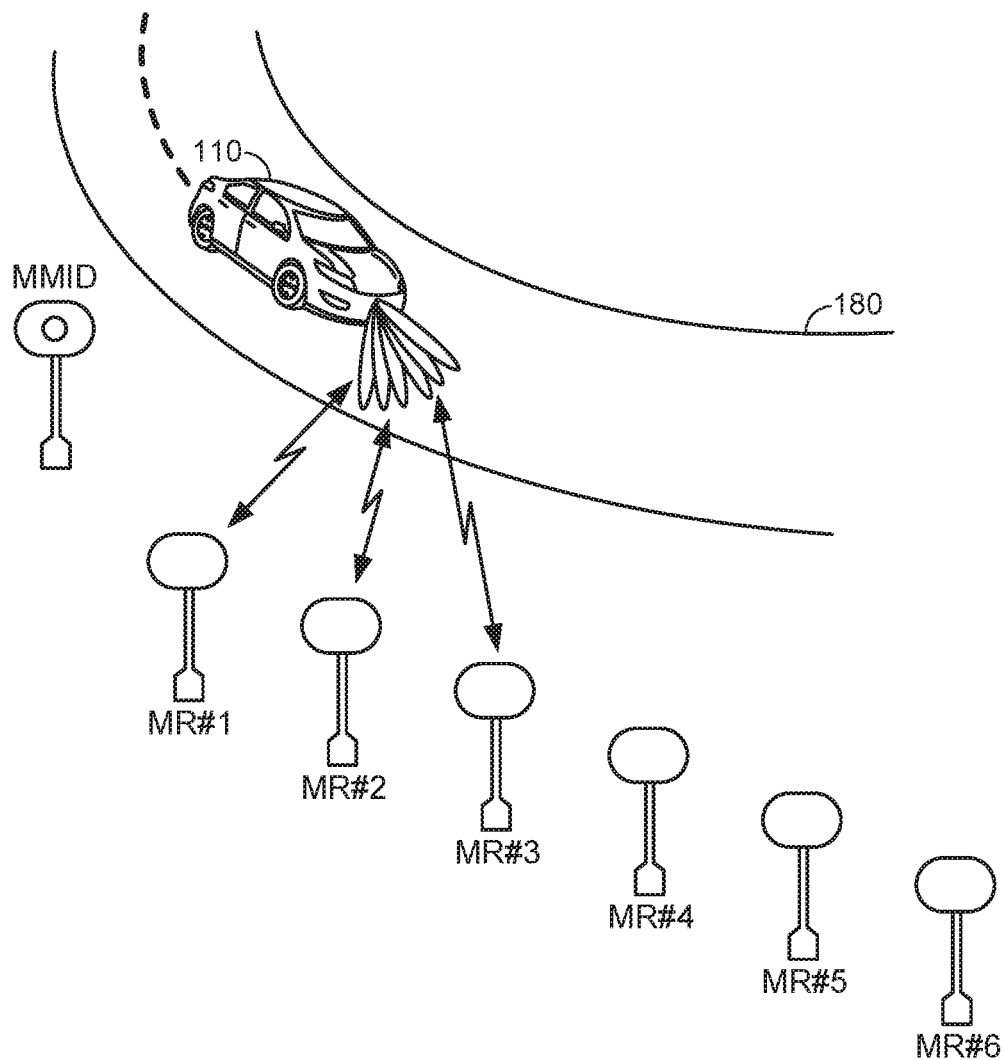
FIGS. 4A, 4B, and 4C illustrate an example process for determining localization of the vehicle 110 using radar-based techniques according to the disclosure.
Figure 4B:
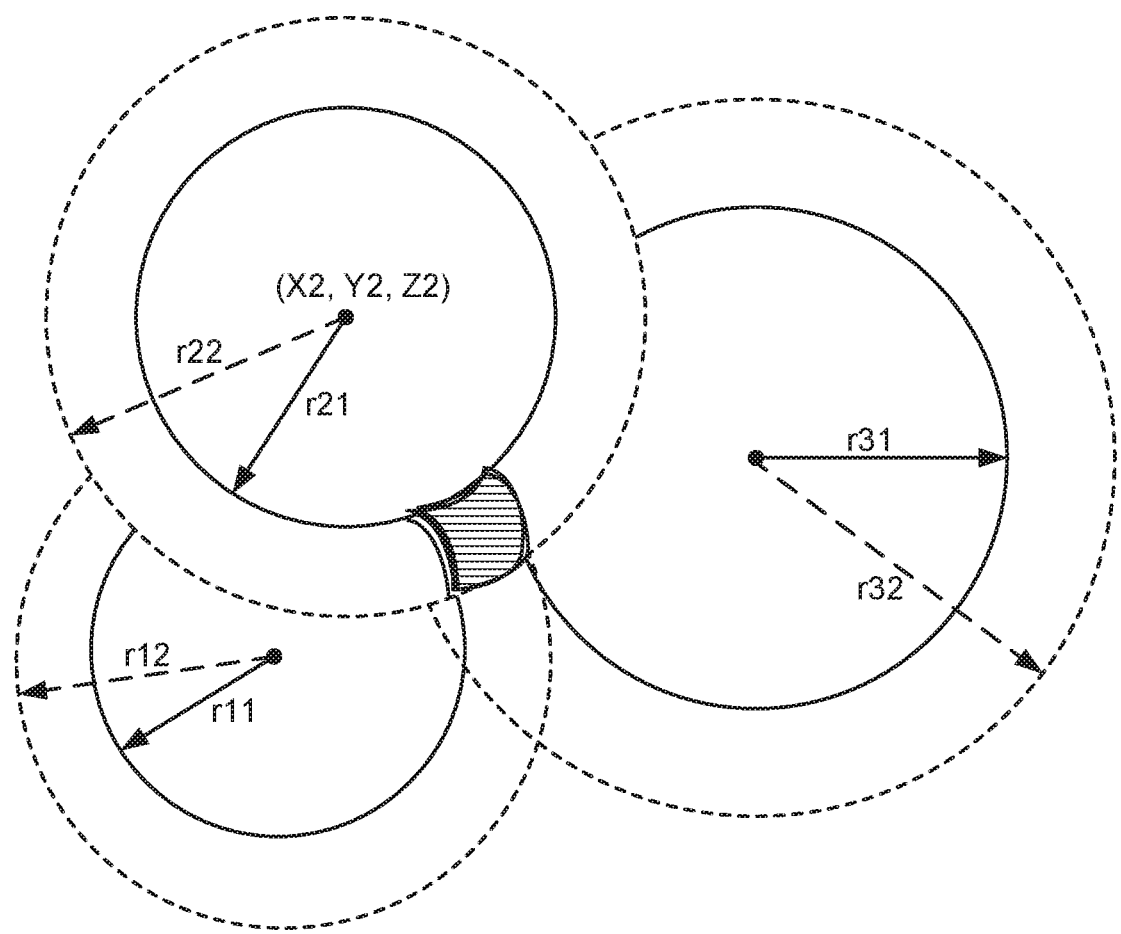
Figure 4C:
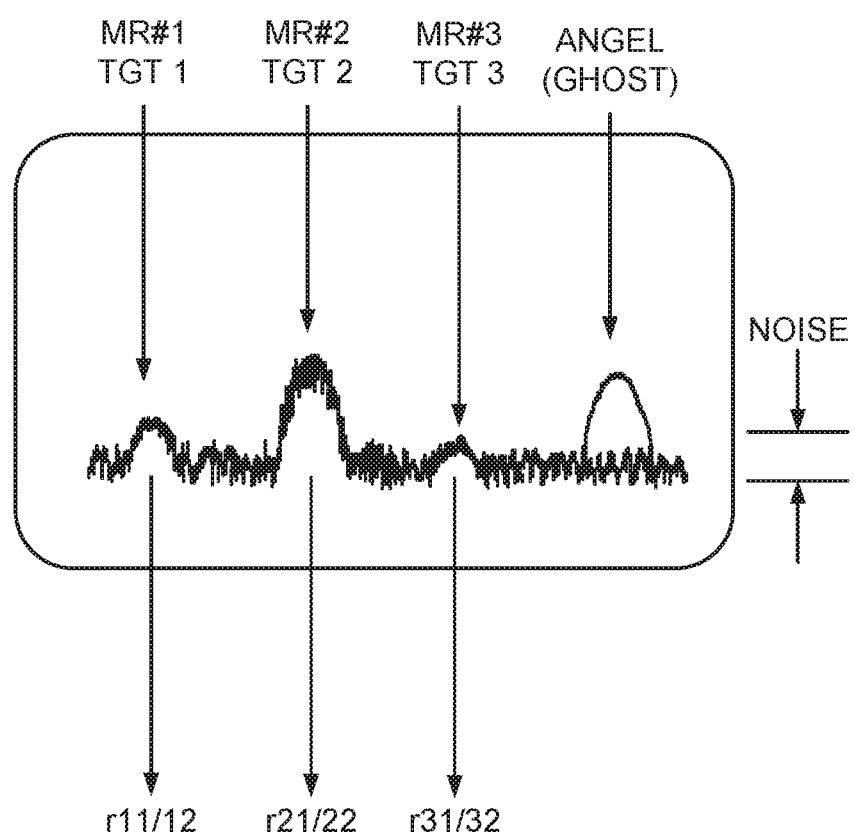

FIGS. 4A, 4B, and 4C illustrate an example process for determining localization of the vehicle 110 using radar-based techniques. FIG. 4A illustrates the vehicle 110 being located on the roadway 180 and proximate to four markers, such as the marker(s) 105 illustrated in FIGS. 1A and 1B. The markers include a marker that includes an RFID MMID tag (marked as "MMID" in FIG. 4, and six radar-reflective markers MR #1, MR #2, MR #3, MR #4, MR #5, and MR #6. The radar transceiver of the vehicle 100 transmits a radar signal, which is reflected by the radar-reflective markers. The marker that includes the RFID MMID tag can return a modulated backscatter signal that includes the tag identification information, such as a tag identifier and/or geographical coordinates of the marker on which the RFID-MMID tag is disposed and also the locations of markers MR #1, MR #2, MR #3, MR #4, MR #5, and MR #6.

FIG. 4C illustrates and example of the signals received by the radar transceiver of the vehicle 110 from a subset of the markers that includes markers MR #1, MR #2, and MR #3. Each of the markers MR #1, MR #2, and MR #3 is associated with a target peak representing the reflected radar signals received from each of the markers. Each of the peaks is subject to a noise factor which affects the accuracy of the radar transceiver. For example, an LRR radar transceiver of the vehicle can have an expected accuracy of approximately 50 centimeter, while an MRR radar transceiver of the vehicle can have an expected accuracy of approximately 7.5 centimeter. Each of the markers MR #1, MR #2, and MR #3 is associated with a target peak plus which can be used to estimate the distance of the vehicle from each of the respective markers. Thus, the estimated distance of each of the markers falls within two concentric circles that mark the minimum and maximum estimated distance of that marker from the vehicle at the time that the signal was received at the vehicle radar transceiver. FIG. 4C references the radius of each of these circles (e.g., radius 11 and radius 12 refer to the two concentric circles associated with marker MR #1, radius 21 and 22 refer to the two concentric circles associated with MR #2, and radius 31 and 32 refer to the two concentric circles associated with MR #3). Returning to the LRR and MRR example discussed previously, the circles marking the minimum and maximum estimated distance would be approximately 50 centimeters apart for the LRR and approximately 7.5 centimeter apart for the MRR due to the respective estimated accuracies of the LRR and the MRR.

FIG. 4B illustrates an example localization solution in which the reflected signals received from the markers can be used to determine the position of the vehicle 110. The locations of the markers can be obtained from navigation data that been developed for the navigable environment (and by RFID MMID backscattered signal in case it exists prior the radar markers). In the example illustrated in FIG. 4B, the location of the vehicle is determined based on three selected radar reflections (SRR, MRR, or LRR) from three markers such as shown is FIG. 4A (markers MR #1, MR #2, MR #3) that can be used to measure TOF between the vehicle 110 and the respective marker from which the reflection was received. Based on the reflected signals, the navigation unit 270 can estimate how far the vehicle 110 is from each of the markers. As discussed above, two concentric circles that mark the minimum and maximum estimated distance of that marker from the vehicle can be projected around each marker. The location of the vehicle should fall within the two concentric circles. As FIG. 4 illustrates, these circles can overlap one another and a location solution for the vehicle can be determined that comprise an area in which all three of the circles overlap. The size of this area is inversely proportional to the accuracy of the radar (LRR or MRR). The more accurate the radar transceiver, the smaller the area. The less accurate the radar transceiver, the larger the area. The type of marker can also affect the accuracy. For example, a localization solution can be based on fine-resolution markers, coarse-resolution markers, or a combination thereof. The navigation data comprising the marker maps can identify which the type of marker disposed at a particular location. A larger estimated distance between the two concentric circles can be utilized for situations where a marker is known to be or is suspected to be a coarse-resolution marker versus a fine-resolution marker. Furthermore, the navigation unit 270 of the vehicle can be able to distinguish between signals received from coarse-resolution and fine-resolution markers based on the differences in the radar cross section of the two types of marker. The coarse-resolution markers will have a larger radar cross section than the fine-resolution markers.

The accuracy of the measurements obtained by each of the radar transceivers impacts the uncertainty associated with location solutions determined using signal measurements obtained using those radar receivers. The uncertainty of the location solutions can be expressed in terms of dilution of precision (DOP). DOP can be used to specify the effects of the geometry of the markers from which the signal measurements were obtained to determine a localization solution. In a situation where the markers from which signals are used to determine a position location are closer together, the geometry can be referred to as "weak" and the DOP value is higher than a situation where the markers are relatively farther apart. The DOP can be expressed as several different measurements: (1) horizontal dilution of precision (HDOP); (2) vertical dilution of precision (VDOP); (3) position dilution of precision (PDOP); and (4) time dilution of precision (TDOP). These measurements can be determined using various techniques known in the art. The DOP measurements can be assigned a rating based on the measurement value. For example, a value of less than 1 may be rated as "ideal" and represent a highest possible confidence level to be used where a highest level of precision is required at all times. A DOP measurement fall into the range of 1-2 may be rated as "excellent" and may be considered accurate enough to meet the requirements of all but the most sensitive applications. The DOP measurements can also be assigned lower ratings, such as "good" (DOP measurement within range of 2-5), "moderate" (DOP measurement within range of 5-10), "fair" (DOP measurement within range of 10-20), and "poor" (DOP value >20). The particular ratings and ranges associated with each rating may vary depending upon the implementation. In some implementations, the navigation unit 270 can be configured to determine one or more DOP measurements for a location solution. The navigation unit 270 can also be configure discard a location solution that falls below a predetermined rating threshold. For example, in some implementations, the navigation unit 270 can be configured to discard a location solution where a DOP measurement associated with that solution falls below an ideal or excellent rating. In the various example implementations illustrated herein, the navigation unit 270 can use the DOP measurements associated with a first localization solution to determine whether the first localization solution provides a more accurate result than a second localization solution and can select either the first or the second localization solution based on this determination.

Figure 5:
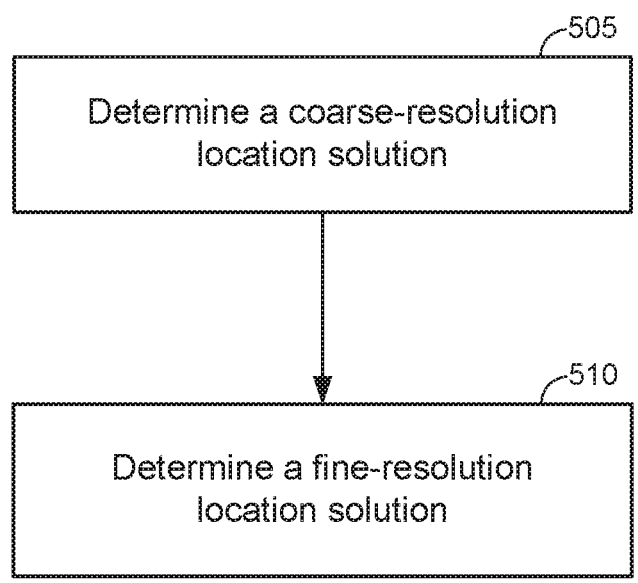
FIG. 5 is an example process for determining a localization solution for the vehicle 110 using reflected marker signals.

FIG. 5 is an example process for determining a localization solution for the vehicle 110 using reflected marker signals and can be implemented by the navigation unit 270 of the vehicle 110, which can in turn operate the radar transceiver(s) 260 of the vehicle 110 to transmit radar signals and to receive reflected radar signals and/or backscatter signals from markers 105. The technique illustrated in FIG. 5 can be used to determine which signals correspond to which marker. The process illustrated in FIG. 5 can also be used with fine-resolution markers, coarse-resolution markers, or a combination thereof. Also, the process can be used to determine a localization solution in which some or all of the reflected signals are reflected laser signals transmitted by a LiDAR transceiver of the vehicle navigations system.

Trilateration based localization is based on reflections from at least three markers (such as in FIG. 4A). When driving along the road, the vehicle either determines the coming markers locations from the RFID/MMID or by looking up the markers that the vehicle is expected to encounter based on the estimated location of the vehicle. The trilateration solution (see FIG. 4B) is based on at least three TOF measurements from at least three markers. The navigation unit knows the locations based on the marker map information but does not know how to relate these locations to the various markers TOFs. To determine a localization solution, the navigation unit solves all optional hypothesis (assumes each time different locations combinations referred to the TOFs received from the markers) and chooses the relevant solution that falls within the roadmap (the ones that fall outside the roadmap are dropped). This iterative approach can be shortened after initial vehicle localization has been performed. Once an existing vehicle location is available, the navigation unit can get utilize the TOF information determined from the signals reflected from the markers to match the signal associated with the shortest TOF with the marker that is expected to be closest to the vehicle based on the marker map information. However, the first time that the navigation unit 270 performs localization, all hypotheses must be considered. Each hypothesis associates the TOF measurements obtained with a different combination of markers. Hypotheses that fall outside of the roadway or other navigable area denoted by the map information for the navigable environment are discarded, and the remaining hypothesis that falls within the roadway or other navigable area can be used as the localization solution for the vehicle. Once the navigation unit 270 has determined the location of the vehicle, the navigation unit 270 can continue tracking the markers as the vehicle 110 continues to move along the roadway or other navigable area. The navigation unit 270 can also perform a shortened localization process by matching time of flight information for reflected signals with upcoming markers based upon the marker map information.

If a location falls outside of the roadmap (or other map of navigable areas of a navigable environment), the navigation unit 270 can be configured to determine all hypotheses based on all available TOF combinations and marker locations to determine a location solution where the vehicle is positioned with a roadway or other navigable area according to the map information for the navigable environment.

The navigation system 270 of the vehicle 110 can be configured to perform a two-stage localization process that includes performing in parallel: (1) using LRR to determine a coarse localization for the vehicle using markers that are farther from the vehicle (e.g., from ~50 to up to ~200 meters from the vehicle), and (2) using MRR or SRR to perform fine-resolution localization based on resolutions coming from fine-resolution markers that are a short or mid-range from the vehicle (e.g., up to ~100 meters). The accuracy of the LRR radar in this example implementation is limited to ~50 centimeters. The ranging error for LRR with bandwidth of approximately 600 MHz is $\geq c/2*BW$, (where c is the light speed) is ~50 centimeters.

Referring back to FIG. 4A, the navigation unit 270 can be configured to make a determination of the coarse location of the vehicle based on the markers farther from the vehicle (e.g., markers MR #3, MR #4, MR #5 and MR #6 in this example) using the LRR of the navigation system of the vehicle (stage 505). The markers are not limited to markers disposed on a pole, but also can incorporate infrastructure elements that can serve as coarse-resolution markers, such as metallic lamp poles and other such infrastructure elements that have a large RCS. However, the use of such infrastructure elements can degrade the LRR ranging accuracy due to RCS delay spread (e.g., from pole-bottom to pole-top where a light pole is used).

Once the navigation unit 270 has determined the coarse localization for the vehicle 110, a fine-resolution localization can be performed using the MRR and/or SRR of the navigation system of the vehicle (stage 510). In an example implementation, the MRR radar has a bandwidth of 4 GHz and a ranging error of ~7.5 centimeters ($c/2*BW$) to reach fine localization accuracy of 7.5 centimeters. The fine-resolution localization can be based on fine-resolution markers that have a relatively small form-factor that minimally impact the MRR radar ranging accuracy. Examples of such markers are illustrated in FIGS. 6A-6D. The markers can be spaced relatively far apart along the roadway or other navigable portion of a navigable environment in order to reduce infrastructure expenses related to installation of such markers, while still providing markers that are sufficiently close to one another that the MRR can detect reflected signals from enough of them to determine a fine-resolution localization solution. For example, the markers may be disposed approximately 50 meters apart in some implementations based on the estimated range of the MRR. In other implementations the markers can be closer together, farther apart, or at variable distances from other another. However, where the markers are spaced further apart, the MRR can only receive reflected signals from two markers. For example, referring back to the example of FIG. 4A, the MRR of the vehicle may only be able to obtain TOF measurements for markers MR #1 and MR #2 in this example. Without three or more markers, the MRR solution will be ambiguous. FIG. 13 illustrates an example of where stage #1 the LRR was able to obtain reflections from three markers, but in stage #2, the MRR was only able to obtain reflections from two markers. Because the MRR solution only includes signals from two markers, the MRR solution determined in stage 2 include two possible locations. However, it is possible to eliminate one of the MRR solutions. If one of the localization solutions falls outside of a roadway or other navigable area of the navigable environment according to the map information for the navigable environment, the navigation unit 270 can discard the localization solution that falls outside of the navigable area. In instances where both localization solutions fall within navigable areas, the navigation unit 270 can compare the localization solutions to the LRR localization solution, and the MRR localization solution that falls outside of the LRR localization solution can be discarded. The MRR has a higher accuracy than the LRR, and one of the MRR-based localization solutions should fall within the localization error range of the LRR-based solution.

Using the process illustrated in FIG. 5, the navigation unit 270 can determine a very accurate localization for the vehicle in the order of approximate 7.5 centimeters (within the accuracy of the MRR for this example implementation) even though the MRR has only received reflected signals from only two fine-resolution markers. In an ideal implementation, the spacing of the fine-resolution markers throughout the navigable environment should be selected to ensure that the MRR of vehicle can receive reflected signals from at least three markers. Where the MRR and the LRR both receive at least three reflected radar signals, the MRR localization solution can be selected as the MRR-based solution should have a higher accuracy. The navigation unit 270 of the vehicle can then use the selected solution to navigate the vehicle. However, the technique illustrated in FIG. 5 allows the navigation unit 270 to be able to determine a fine-resolution localization solution under real-world conditions where a fine-resolution marker may be hidden or obstructed by another vehicle or by debris, where a fine-resolution marker is missing or damaged, or where other unexpected interference absorbs, reflects, scatters, or otherwise impedes the radar signals from a fine-resolution marker.

Figure 6A:
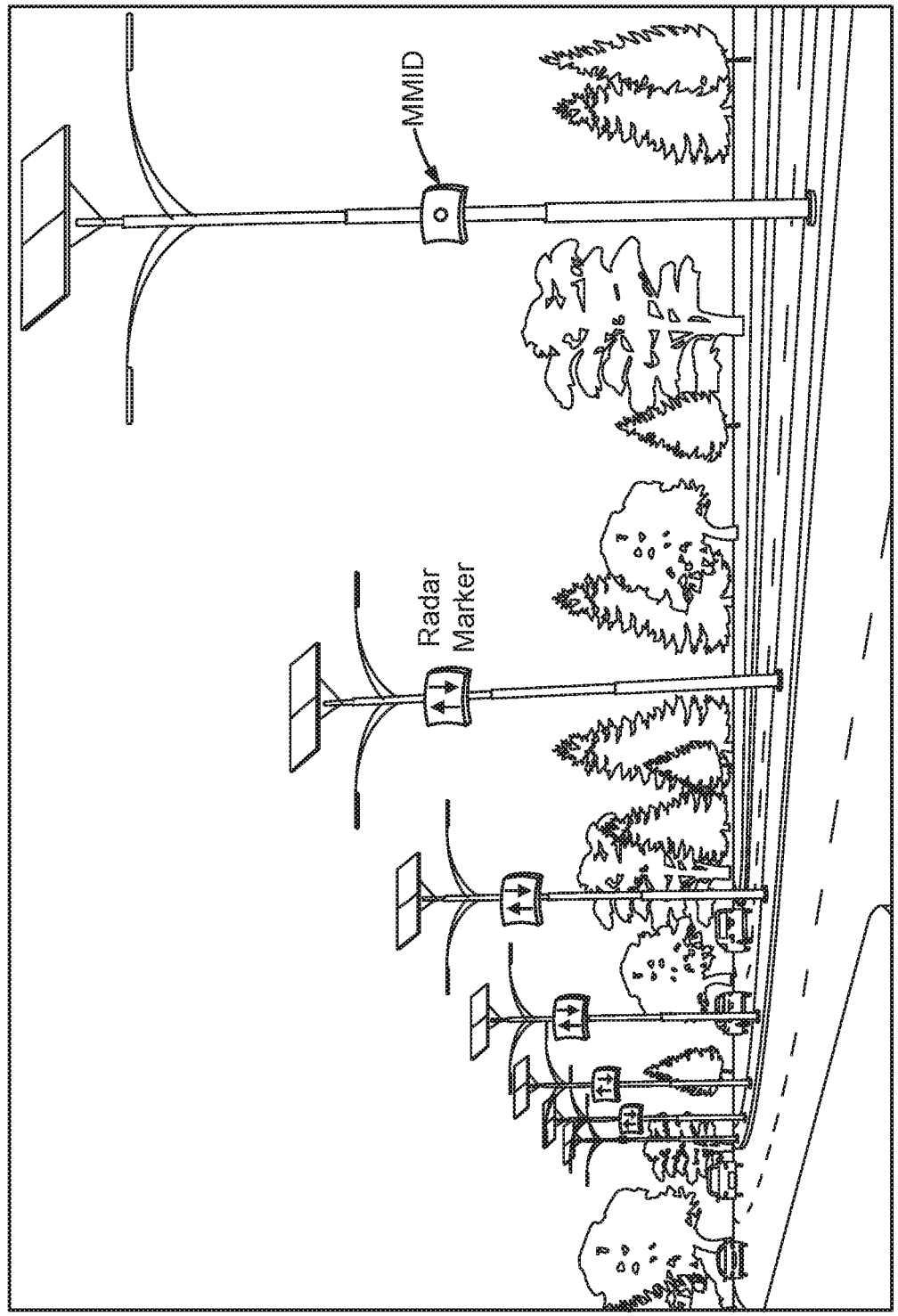
FIGS. 6A, 6B, 6C, 6D, and 6E are examples illustrating the placement of markers 105 within various examples of navigable environments.
Figure 6B:
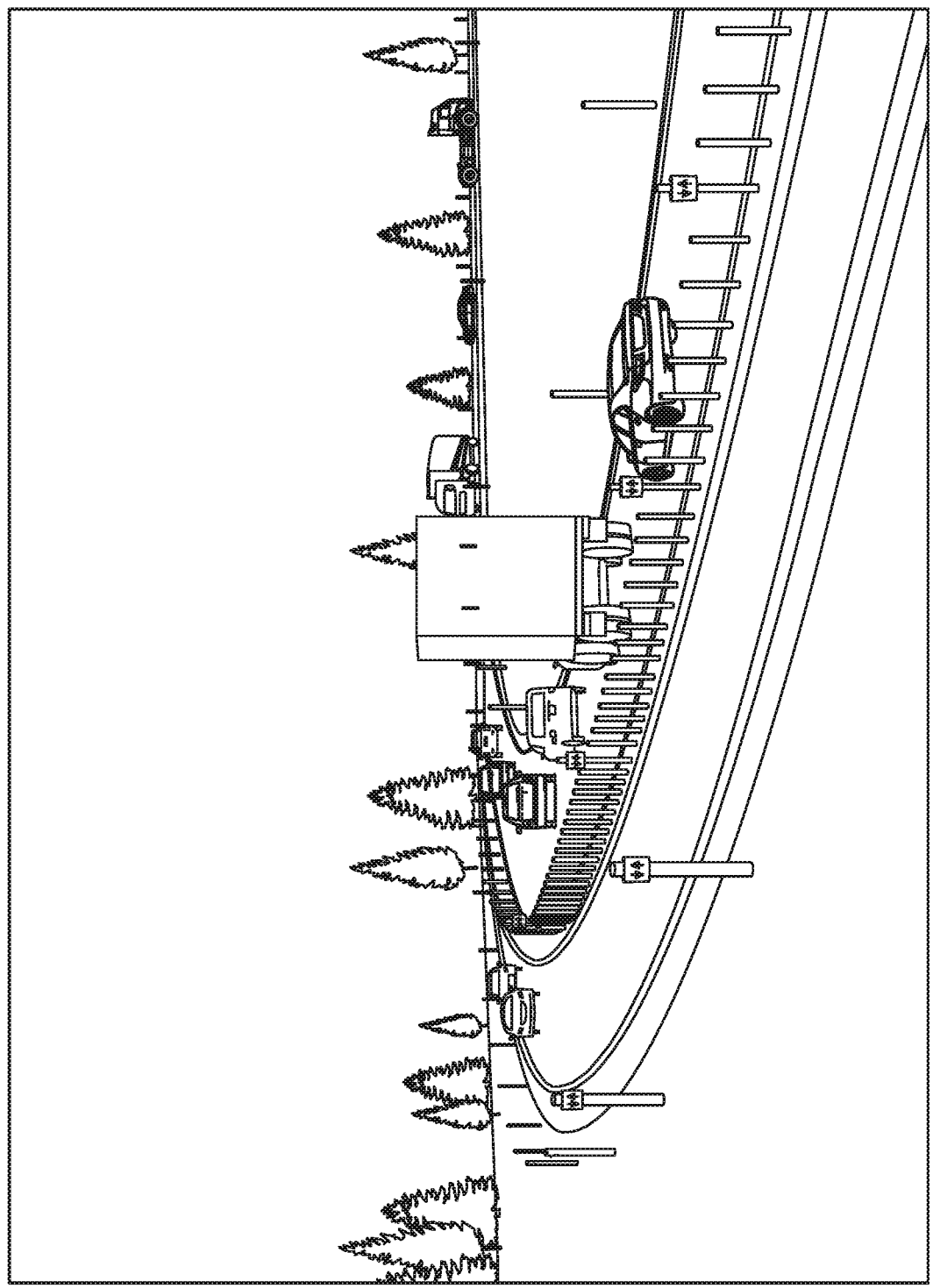
Figure 6C:
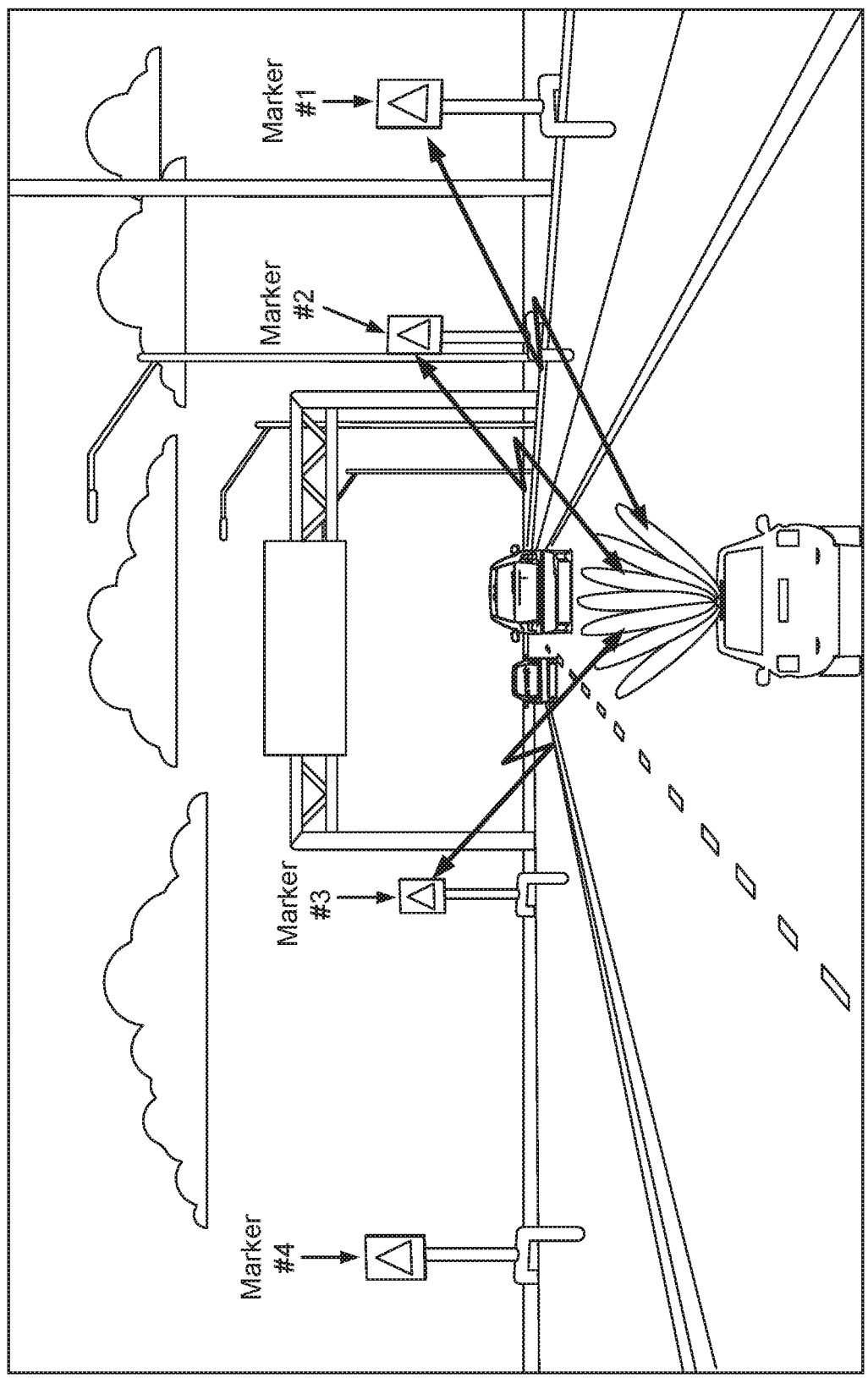
Figure 6D:
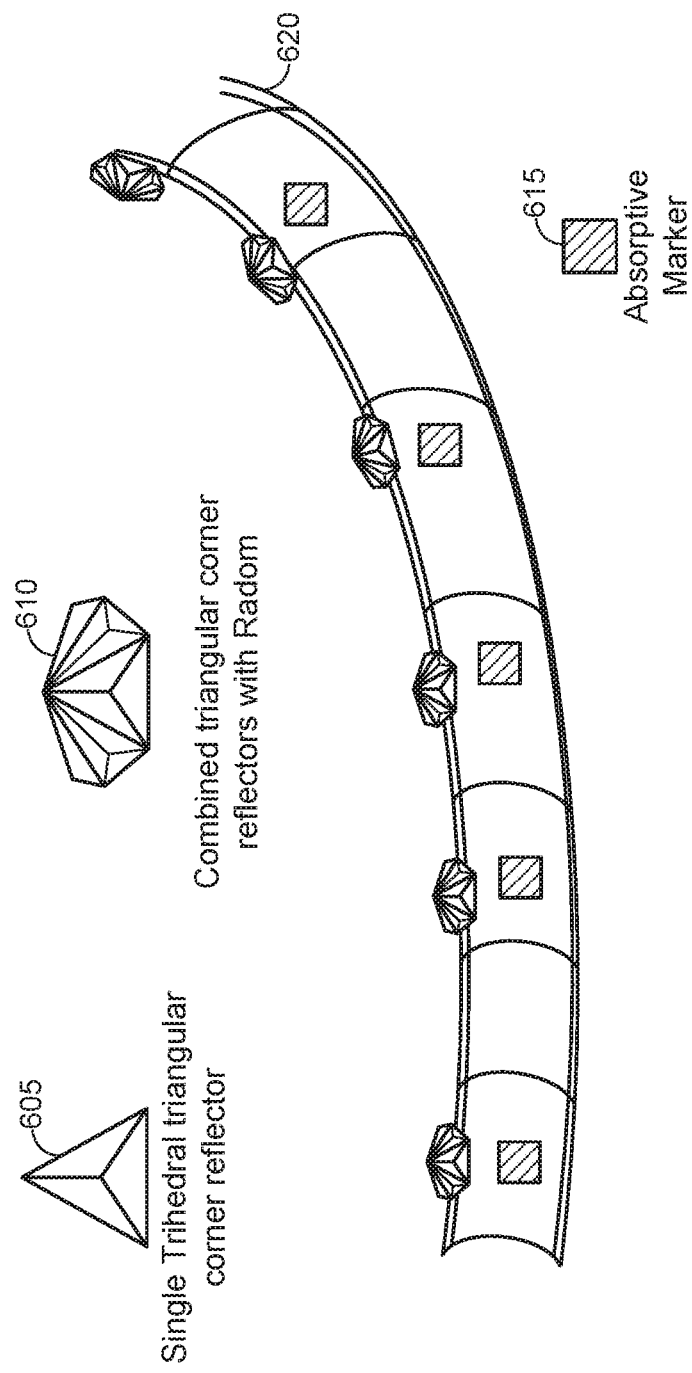
Figure 6E:
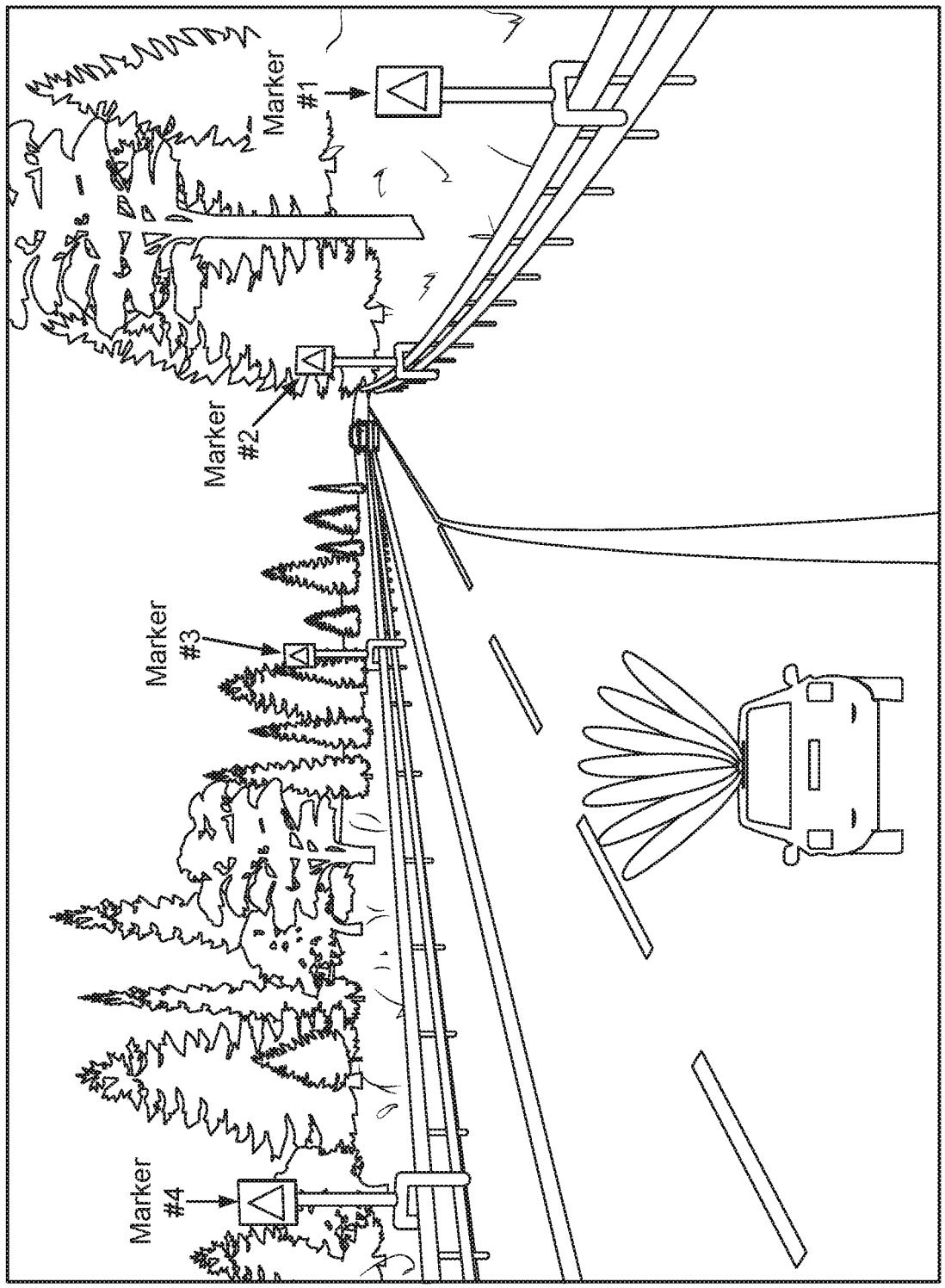

FIGS. 6A, 6B, 6C, 6D, and 6E are examples illustrating the placement of markers 105 within various examples of navigable environments. FIG. 6A illustrates that the markers 105 can be disposed on existing infrastructure, such as light poles. The radar reflectors and/or RFID MMID tags of the markers are disposed above the road surface where the markers can reflect radar signal transmitted by the radar transceiver(s) of the vehicle 110. The location above the road surface can help keep the markers free of snow and/or pooling water which could impact markers disposed on or at the level of the road surface. FIG. 6B illustrates that the markers 105 can be disposed on existing infrastructure, such as lane dividers, walls, and/or reflective poles disposed along the side of the road marking the travel lanes. FIG. 6C illustrates that the markers 105 can be disposed on existing infrastructure, such as lane dividers, walls, light poles, and/or gantries supporting signage, cameras, and/or other road infrastructure elements. Other infrastructure, such as bridges, overpasses, and/or tunnel walls can also serve as mounting points for markers 105. FIG. 6E illustrates another example of markers being disposed on poles mounted on metal barriers disposed along the side of the road. Fine-resolution markers can be disposed on existing road barriers, such as the metal barrier illustrated in FIG. 6E or the concrete barrier illustrated in FIG. 6D. Barriers having a relatively low profile approximately 1 meter in height and approximately parallel to the direction in which the vehicle is travelling are preferred, but markers can be disposed on other types of barrier configurations. Reflected signals from the markers can be used to determine a fine localization solution for the vehicle using the LRR and/or the MRR of the vehicle.

FIG. 6D illustrates several types of markers that might be utilized according to the various techniques disclosed herein and illustrates and example of markers disposed along the top of a dividing wall 620. One example marker 605 is a single tetrahedral triangular corner reflector design. Another example marker 610 is a combined triangular corner reflector design. The marker 610 can include a radom to cover the marker 610 to protect the marker 610 from the accumulate of snow and/or other materials on the marker 610. The radom comprises a material through which the radar signals and backscatter signals can pass with little to no signal attenuation. The markers 605 and 610 can provide nearly three-hundred-and-sixty-degree coverage for reflecting signals back to vehicles. The markers 605 and/or 610 could be placed on the top of a lane dividing barrier (such as barrier 620) or other such infrastructure. The markers 605 and/or 610 can be mounted directly on the barrier or other infrastructure element or can be mounted on a holding device that raises the markers 605 and/or 610 up from the surface of the barrier and/or other infrastructure element to help increase the visibility of the markers. Furthermore, while the markers 605 and 615 utilize a radar reflective material, the marker 615 utilizes a radar absorptive material. In implementations that utilize markers comprising absorptive materials, the navigation unit 270 can be configured to measure the "deep" signal within the reflected radar signals to identify the presence of a marker. Rather than looking for peaks in the reflected radar signals, the navigation unit 270 can look for a drop in the signal indicative of the signal being absorbed by a marker comprising radar-absorptive material. Other implementations could utilize markers comprising a mesh material that discourages the buildup of snow and/or other debris on the markers. Furthermore, the use of absorptive materials can also be combined with reflective materials in some implementations, and the navigation unit 270 can be configured to recognize the presence one or both types of reflectors in the radar signals received by the radar transceiver of the vehicle 110. The radar-reflective markers can be disposed on a radar-absorptive material. The radar absorptive material can surround the radar-reflective portion of the marker. To illustrate this concept, a variation of the marker illustrated in FIGS. 12C and 12D. The radar-reflective markers can also include laser-absorptive material that can absorb radar signals transmitted by the LiDAR transceiver of the navigation system of the vehicle. Materials that are configured to scatter radar signals and/or LiDAR signals can also be used instead of absorptive materials.

FIGS. 6A, 6B, 6C, and 6D illustrate example implementations where the markers 105 are disposed on existing infrastructure elements proximate to the roadway or other navigable environment, such as lane barriers, lamp posts, and/or other such existing elements. Placing the markers 105 on existing infrastructure elements can provide a more cost-effective solution that can reduce or eliminate the need for additional infrastructure to support the localization techniques disclosed herein. Corner reflectors, such as those illustrated in FIGS. 6A, 6B, 6C, and 6D have a high radar cross section (RCS), which can help identify the markers 105 even where there are metal object surrounding the markers 105 that can also reflect radar signals transmitted by the radar transceiver(s) 260 of the vehicle 110. Furthermore, the markers can be omnidirectional or nearly omnidirectional to facilitate reflection of the radar signals from the vehicle 110 regardless of the angle of the vehicle 110 relative to the marker 105. Markers 105 can be distinguished from surrounding metal objects by mounting markers that have high RCS relative to the surrounding materials. Markers 105 can also utilize absorptive materials that have a lower RCS than surrounding materials, and the navigation system of the vehicle 260 can be configured to identify the deep signal from surrounding reflections. Furthermore, the shape of the reflectors of the markers 105 can resist buildup of snow, mud, and/or other debris that could absorb, reflect, scatter, or otherwise impede the radar signals from the vehicle and/or the reflected radar signals from the markers 105. In some implementations, the radar transceiver(s) 260 of the vehicle 110 can also be configured to utilize dual-polarization radar, which can improve the detection of the markers 105. Dual-polarization radar transceivers are configured to transmit radar pulses in both a horizontal and a vertical polarization. The transceiver can be configured to alternate between the polarizations to facilitate identification of the markers in the reflected signals received by the radar transceiver.

FIG. 7 is a flow diagram of a process for operating a navigation system according to the techniques disclosed herein. The process illustrated in FIG. 7 can be implemented by the navigation unit 270 of the vehicle 110 unless otherwise specified. The local operating environment can impact the efficacy of various localization techniques. For example, the accuracy of a camera-based and LiDAR-based localization techniques can be negatively impacted due to adverse weather conditions, such as rain, snow, fog, dust, smoke, dust, and/or other airborne matter that can obscure visual indicators used by camera-based localization techniques and can scatter, reflect, and/or absorb the lasers used by LiDAR-based localization techniques. In such adverse conditions, the accuracy of radar-based localization techniques can match or surpass the accuracy of camera-based and/or LiDAR-based localization techniques. Furthermore, the vehicle can include an GNSS receiver for receiving signals from one or more satellite positioning systems (SPS), but the signals can be obscured in poor weather conditions and can also be blocked by natural features and man-made structures disposed between the vehicle 110. GNSS is not effective in indoor environments where satellite signals cannot reach unless pseudolites, small transceivers that provide transmit navigation signals similar to those transmitted by SPS satellites, are deployed in the indoor environment to facilitate GNSS navigation.

A plurality of vehicle localization solutions can be determined using a different localization technique to determine each of the localization solutions (stage 705). The navigation unit 270 of the vehicle can be configured to determine where the vehicle is located within the navigable environment, such as a position of the vehicle along a road using multiple localization techniques. For example, the vehicle 110 can be equipped with radar transceiver(s) 260, LiDAR transceiver(s) 265, and optical sensor(s). The radar transceiver(s) 260 can also include an MRR and LRR, and a different localization solution can be determined based on reflected radar signals and/or backscatter signals received from markers 105. A localization solution can be determined using the example technique illustrated in FIGS. 4A, 4B, 4C and 5 as discussed above. For example, the MRR transceiver of the vehicle 110 can receive reflected radar signals and/or backscatter from markers 105 that fall within the range of the MRR transceiver, and the LRR transceiver of the vehicle 110 can receive reflected radar signals and/or backscatter from markers 105 that fall within the range of the LRR transceiver. Because the LRR has a greater range than the MRR, the LRR may receive more reflected radar signals and/or backscatter from markers 105 than the MRR. The navigation unit 270 can be configured to calculate a LiDAR-based localization solution based on reflected signals received at the LiDAR transceiver(s) 265 and/or one or more radar-based localization solutions based on signals received at the radar transceiver(s) 260 (the navigation unit 270 can be configured to calculate a separate localization solution based on the reflected radar signals and/or modulated backscatter signals received by each radar transceiver). Furthermore, the optical sensor(s) can include camera(s) that can be used to capture images of the lane marker lines, signage, markers 105, and/or other infrastructure surrounding the vehicle. The navigation unit 270 can be configured to calculate a localization solution based on the imagery captured by the camera(s). The vehicle navigation system can also be equipped with a GNSS receiver that can be used to receive signals from satellites of one or more satellite positioning systems. The navigation unit 270 can be configured to calculate a localization solution based on the satellites of the SPS system(s). The GNSS transceiver of the navigation system may not receive a sufficient number of SPS signals to determine a precise location of the vehicle 110 because signals from the SPS satellites may be obstructed.

A localization solution can be selected from the plurality of localization solutions based on attributes of each of the localization solutions (stage 710). The navigation unit 270 can be configured to determine compare a localization solution determined using a camera and/or a localization solution determined using LiDAR with a localization solution determined using radar. The radar localization solution can be determined using the MRR and/or the LRR. The navigation unit 270 can be configured to determine whether the localization solution determined using the camera and/or the localization solution using the radar differs by more than a predetermined amount. For example, the radar ranging accuracy for the MRR can be approximately 7.5 centimeters in some implementations. The navigation unit 270 can be configured to utilize the radar solution over a camera-based localization solution and/or a LiDAR-based localization solution where the camera-based localization solution and/or the LiDAR-based localization solution differ from the radar-based localization solution by more than 7.5 centimeters or another predetermined amount. The predetermined amount can be based on the expected accuracy of the radar transceiver used to determine the radar-based localization solution. The predetermined amount can differ from the expected accuracy of the radar transceiver. For example, a padding value can be added or subtracted from the expected accuracy of the radar transceiver to determine the predetermined amount used by the navigation unit 270 to determine whether to select the radar-based localization solution over a camera-based and/or LiDAR-based localization solution. The accuracy of the LiDAR-based and/or the camera-based solutions can be degraded due to bad weather conditions, such as snow, fog, rain, smoke, and/or other conditions where the camera may be blurred and/or LiDAR signals may be absorbed, reflected, and/or scattered. Under clear conditions, the LiDAR-based localization solutions and/or camera-based localization solutions typically provide a more accurate localization solution than the radar-based localization solution. In some implementations, the LiDAR-based localization solutions may fall within approximately 2 centimeters of the actual location of the vehicle 110 while the radar-based localization solutions may fall within approximately 7.5 centimeters of the actual location of the vehicle 110. If the LiDAR-based localization solutions and/or camera-based localization solutions are more than 7.5 centimeters or whatever the predetermined amount associated with the particular radar transceiver used to determine the radar-based localization solution. Furthermore, the accuracy of a radar-based solution can be affected by the type of marker that was used to determine the localization solution. A localization solution using fine-resolution markers can provide a more accurate solution than one determined using coarse-resolution markers The reliability of the localization solutions can be considered when selecting a localization solution. A localization solution can be selected from the plurality of localization solutions based on the reliability of each of the localization solutions under specific operating conditions. The operating conditions can be but are not limited to being weather related, such as fog, snow, dust, smoke, icy precipitation, icy road conditions, or rain conditions. The operating conditions can be related to ambient lighting conditions, such as night, sunny, or partial sun. The angle of the sun relative to the marker and/or the LiDAR or camera of the vehicle can also be taken into consideration because the performance of the optical and LiDAR sensors can be negatively impacted by ambient lighting conditions. The operating conditions can also include traffic conditions. Some localization solutions may be impacted by high traffic volume and/or by the presence high profile vehicles which can interfere with receiving reflected radar or laser signals from markers and with optical localization techniques that rely on landmarks to navigate. The operating conditions can be determined based on sensor data determined by sensors disposed on the vehicle and/or by weather information and/or road condition information received wirelessly from a reporting source, such as a weather service or road conditions service. The reliability of a particular solution can also be determined based on factors such as consistency of the localization solutions provided by a particular localization technique (e.g. camera-based, LiDAR-based, radar-based (LRR/MRR/SRR)). The navigation unit 270 can be configured to determine a reliability score for each of the localization solutions based on the technique used to determine the localization solution and the operating conditions at the time that the localization solution was determined. The navigation unit 270 can also be configured to base the reliability of a particular localization solution at least in part on the accuracy of the localizations solution provided using a particular localization technique. For example, if a particular localization solution oscillates between two or more position fixes, then the reliability score of that particular localization solution can be decreased. However, if a particular solution maintains a steady position fix for the vehicle, then the reliability score associated with that localization solution can be increased.

Each of the types of localization solution can be associated with a threshold reliability score. The threshold reliability score associated with a particular type of localization solution can be selected such that if the reliability score associated with that localization solution meets or exceeds the threshold value, that type of localization solution is sufficiently reliable enough to be used for autonomous or semi-autonomous navigation. However, if a reliability score associated with a particular type of localization solution falls below the threshold reliability score for that type of localization solution, then the localization solution can be discarded for navigation purposes. If all localization solutions available for navigation purposes fall below their respective reliability scores, then the navigation unit 270 can be configured to alert a driver of the vehicle that manual navigation is required, and the driver must take over the control of the vehicle. For solutions where no driver is present, the navigation unit 270 can send an alert to a management or dispatch system for the vehicle for instructions, may slow or stop the vehicle, and may attempt to move the vehicle off the roadway or other navigable area.

The navigation unit 270 can be configured to take into account both the accuracy and the reliability of the localization solutions when determining which localization solution to select. The navigation unit 270 can discard those localization solutions that do not meet the reliability threshold associated that particular type of localization solution and to select a localization solution from the remaining localization solutions that meet the reliability thresholds. The navigation unit 270 can also be configured to weight the localization solutions based on the reliability score. The navigation unit 270 can be configured to determine a hybrid solution from two or more of the localization solutions having the highest reliability scores among the localization solutions that have been determined. The navigation unit 270 can also be configured to select two localization solutions having the highest reliability scores and to perform a selection technique based on the accuracy of the selected localization solutions, such as the example processes illustrated in FIGS. 8, 9, and 17.

In some implementations, the vehicle 110 can include an LRR and MRR, and the navigation unit 270 can be configured to determine a localization solution based on the LRR and the MRR. In some example implementations, the MRR can have an expected accuracy of approximately 7.5 centimeters and the LRR can have an expected accuracy of approximately 50 centimeters. The navigation unit 270 can be configured to determine an MRR-based localization solution and an LRR-based localization solution. The navigation unit 270 can be configured to select a localization solution that falls within the MRR range over a localization solution that falls outside of the MRR range but within the LRR range, because the expected accuracy of the MRR is typically higher than that of the LRR.

In some implementations, the vehicle can include a camera used to capture images and/or video of the roadway and the navigation unit 270 can be configured to use the content captured by the camera to track the lines used to demarcate the travel lanes along the roadway. The navigation unit 270 can be configured to track these lines to determine the position of the vehicle relative to the travel lane and to generate control signals to the vehicle control unit 275 that can be used to steer the vehicle so that the vehicle remains in the travel lane. However, environmental conditions can degrade camera performance as discussed above. But, the travel lanes can include radar-reflective markers disposed along the travel lanes. An example of such a configuration is illustrated in FIGS. 1A and 1B. The navigation unit 270 can be configured to perform lane tracking using both the camera and at least one radar transceiver of the vehicle 110 and can determine whether to use the camera-based solution or the radar-based solution is providing better accuracy and can select that localization solution for lane tracking. For example, if the expected accuracy of the camera-based solution falls below the expected accuracy of the radar-based solution, the navigation unit 270 can be configured to select the radar-based solution for lane tracking. The navigation unit 270 can be configured to use the radar-based solutions for lane tracking in addition to determining the location of the vehicle along the roadway as discussed above.

Stage 710 can be modified to determine a hybrid localization solution based on more than one localization solution rather than a single localization solution as discussed above. The navigation unit 270 can be configured to determine a midpoint between the two solutions. The navigation unit 270 can be configured to select the two or more localization solutions based on the reliability score associated with those solutions. The navigation unit 270 can be configured to select each localization solution of the plurality of localization solutions that has a reliability score that meets or exceeds the threshold reliability score for that type of localization solution. The navigation unit 270 can also be configured to weight the localization solutions based on their reliability scores. The navigation unit 270 can be configured to apply a higher weight to localization solutions having a higher reliability score and less weight to localization solutions having a lower reliability score, such that the hybrid localization solution ends up being closer to the localization solution or solutions that have the higher reliability scores than those that had a lower reliability score.

The selected localization solution can be used for navigation of the vehicle 110 through the navigable environment (stage 715). The navigation unit 270 can be configured to use the selected localization solution to navigate the vehicle 110 through the navigable environment. The navigation unit 270 can be configured to send control signals to the vehicle control unit 275 to navigate the vehicle 110 through the navigable environment based on the selected localization solution.

FIG. 8 is a flow diagram of an example process for selecting a localization solution according to the techniques disclosed herein. The technique illustrated in FIG. 8 can be used to implement, at least in part, stage 710 of the process illustrated in FIG. 7. The process illustrated in FIG. 8 can be implemented by the navigation unit 270 of the vehicle 110 unless otherwise specified. In this example process, the first and second localization solutions represent two different localization solutions having different expected accuracies, and the second localization solution has an expected accuracy that is higher than that of the first localization solution. In one example implementation, the first localization solution may be a radar-based solution and the second localization solution may be a LiDAR-based solution. In another example implementation, the first localization solution may be an LRR radar-based localization solution, and the second localization solution may be an MRR radar-based localization solution.

A distance between a first localization solution and a second localization solution can be determined (stage 805). The navigation unit 270 can be configured to determine a distance between the first localization solution and the second localization solution. The distance can be expressed in centimeters, inches, or other units of measurements used to express distance. The first localization solution and the second localization solution can be expressed in two or three dimensional geometric coordinates, and the navigation unit 270 can be configured to determine the distance between these two coordinates using various known techniques.

A determination can be made whether the distance exceeds an expected accuracy value of the first localization solution (stage 810). The navigation unit 270 can be configured to compare the distance determined in stage 805 to an expected accuracy value associated with the first localization technique. According to an example implementation, the first localization solution can be a radar-based localization solution that has an expected accuracy of approximately 7.5 centimeters and the second localization solution can be a LiDAR-based localization solution. The navigation unit 270 can determine whether the distance determined in stage 805 exceeds 7.5 centimeters. This example is not intended to limit the techniques disclosed herein to the specific localization techniques and expected accuracy in this example. In other implementations, the first localization technique can be determined using other techniques that can have a different expected accuracy. At stage 815, the process can continue with stage 820 responsive to the distance exceeding the expected accuracy value or otherwise continue with stage 825.

The first localization solution can be selected (stage 820) responsive to the distance estimate exceeding the expected accuracy value of the first localization solution. The navigation unit 270 can be configured to select the first localization solution when the distance between the first localization solution and the second localization solution exceeds the expected accuracy value of the first localization solution. To illustrate this concept, in an example implementation, the second localization solution is a LiDAR-based and/or camera-based localization solution and the first localization solution is a radar-based localization solution that utilizes the MRR. In this example, the expected accuracy of the LiDAR-based and/or camera-based solution should be within approximately 2 centimeters while the expected accuracy of the radar-based solution using the MRR should be approximately 7.5 centimeters. If the distance between the first localization solution and the second localization solution exceeds 7.5 centimeters (the expected accuracy for radar-based solutions in this example), the navigation unit 270 can select the first localization solution. The signals transmitted by the LiDAR transceiver(s) 265 of the navigation system of the vehicle 110 may be absorbed, reflected, or scatted and/or the imagery captured by the camera of the navigation system of the vehicle 110 may be blurred due to weather conditions, such as snow, rain, fog, smoke, dust, particulate matter, or other such conditions. The accuracy of the LiDAR-based and/or camera-based solutions can fall below that of the radar-based solutions as a result of these or other conditions. However, radar is much more resilient to such weather conditions and can provide a more accurate localization solution operating under such conditions. While the example discussed herein compares the localization solutions produced by LiDAR and radar, the techniques discussed herein are not limited specifically to LiDAR and radar and can be utilized to select among localization solutions determined utilizing other techniques in addition to or instead of the localization techniques used in the example.

The second localization solution can be selected (stage 825) responsive to the distance estimate not exceeding the expected accuracy value of the second localization solution. If the distance between the first and second localization solutions does not exceed the expected accuracy of the first localization solution, then the navigation unit 270 can be configured to select the second localization solution for use in navigating the vehicle 110 through the navigable environment and/or for use in determining a location of the vehicle 110 for generating map data that includes the locations of markers 105 proximate to the vehicle 110. Returning to the example discussed above with respect to stage 820, the second localization solution is a LiDAR-based and/or camera-based localization solution and the first localization solution is a radar-based localization solution that utilizes the MRR. In this example, the expected accuracy of the LiDAR-based and/or camera-based solution should be within approximately 2 centimeters while the expected accuracy of the radar-based solution using the MRR should be approximately 7.5 centimeters. Since the two localization solutions were relatively close together (the distance apart was less than the expected accuracy of the second localization solution), the navigation unit 270 can select the second localization solution for navigating the vehicle 110 since it does not appear that the second localization technique used to determine the second localization solution was impacted by adverse environmental conditions or other factors that would degrade the accuracy of the localization solution.

FIG. 9 is a flow diagram of an example process for selecting a localization solution according to the techniques disclosed herein. The technique illustrated in FIG. 9 can be used to implement, at least in part, stage 710 of the process illustrated in FIG. 7. The process illustrated in FIG. 9 can be implemented by the navigation unit 270 of the vehicle 110 unless otherwise specified. The technique illustrated in FIG. 9 can be used to determine a localization solution for a vehicle where the vehicle includes multiple radar transceivers. For example, the vehicle can include an LRR and an MRR, and the technique illustrated in FIG. 9 can be used to select a localization solution. The MRR can have approximately a one-hundred-meter range with a radar pulse bandwidth of approximately 500 MHz with a localization error of approximately 7.5 centimeters, while the LRR can have approximately a 200-meter range with a radar pulse bandwidth of approximately 4 GHz with an estimated localization error of approximately 50 centimeters. The longer range of the LRR can allow the LRR transceiver to receive more reflected radar signals than the MRR in some instances due to the longer range of the LRR. The markers can be deployed along the roadway such that at least four reflected markers fall within the typical range of the LRR and at least two markers fall within the typical range of the MRR. Under such conditions, the LRR may be able to determine a localization solution that include reflections from three markers, while the MRR may only be able to determine a localization solution that includes reflections from two markers. FIG. 13 illustrates this situation, the LRR solution is determined in stage 1. Because the MRR solution only includes signals from two markers, the MRR solution determined in stage 2 include two possible locations. However, it is possible to eliminate one of the MRR solutions. If one of the localization solutions falls outside of a roadway or other navigable area of the navigable environment according to the map information for the navigable environment, the navigation unit 270 can discard the localization solution that falls outside of the navigable area. In instances where both localization solutions fall within navigable areas, the navigation unit 270 can compare the localization solutions to the LRR localization solution, and the MRR localization solution that falls outside of the LRR localization solution can be discarded. The MRR has a higher accuracy than the LRR, and one of the MRR-based localization solutions should fall within the localization error range of the LRR-based solution. Where the MRR and the LRR both receive at least three reflected radar signals, the MRR localization solution can be selected as the MRR-based solution should have a higher accuracy. The navigation unit 270 of the vehicle can then use the selected solution to navigate the vehicle.

Returning now to FIG. 9, the navigation unit 270 of the vehicle can determine a first localization solution having a first estimated location and a second estimated location using a first radar transceiver and a second localization solution using a second radar transceiver (stage 905). The range of the first radar transceiver is less than that of the second radar transceiver, and the first radar transceiver only receives two reflected signals from markers, while the second radar transceiver receives at least three reflected signals from markers. The accuracy of the first radar transceiver is also higher than that of the second radar transceiver. The navigation unit 270 can be configured to determine a that the vehicle may be located at a first estimated location and a second estimated location using the signals received by the first transceiver, since the first transceiver only received reflected radar signals from two markers, such as in the example illustrated in FIG. 13. The navigation unit 270 can determine a single localization solution using the signals received by the second radar transceiver, because the second radar transceiver received at least three reflected signals.

The first and second estimated locations can be compared to the second localization solution (stage 910). The navigation unit 270 can be configured to select whichever of the two estimated locations fall within the second localization solution. The selected estimated location can be used as the localization solution that the navigation unit 270 uses to navigate the vehicle 110. The selected estimated location determined using reflected signals obtained by the first radar transceiver should have a higher accuracy than that of the second localization solution determined using reflected signals obtained by the second radar transceiver. In some implementations, the first and second radar transceivers can be configured to determine the estimated locations and/or the localization solutions and provide this information to the navigation unit 270, which in turn can then compare this information to determine the selected estimated location to be used as the localization solution.

While the preceding examples illustrated implementations of techniques which utilize radar-based localization solutions in situations where camera-based and/or LiDAR-based solutions are impacted by adverse conditions, the following examples illustrate examples of utilizing camera-based and/or LiDAR-based localization techniques to generate navigational data that provides accurate locations for markers having radar reflectors. Lidar, in particular, can have a higher accuracy than radar systems in optimal conditions where there aren't conditions present that can cause the LiDAR signals to be absorbed, reflected, scattered, or otherwise impeded. Lidar-based localization techniques can provide a higher level of accuracy in clear weather conditions, where the presence of precipitation or particulate matter in the air can cause the LiDAR signals to be absorbed, reflected, and/or scattered. The lack of such adverse environmental conditions can be determined by an operator of the vehicle 110 or the navigation unit 270 of the vehicle 110 can include sensors that are configured to detect the presence of adverse environmental conditions that may impact the accuracy of LiDAR-based localization techniques and can determine that navigational data should not be captured at that time.

An example mapping technique utilizes markers 105 that include both a LiDAR reflector and a radar reflector to determine "anchor" markers that can be used to provide accurate positioning information for radar-based localization. The information can be collected by vehicle(s) 110 that have navigation systems that include both a LiDAR transceiver and a radar transceiver. The vehicle 110 can be navigated along a roadway or other portion of a navigable environment and both the radar transceiver and the LiDAR transceiver of the navigation system can be operated to identify markers 105 that include both a laser reflector and a radar reflector. The position of the vehicle 110 can be determined using signals from a GNSS system and/or by other means, such as determining the position of the vehicle based on wireless signals received from wireless network nodes located at known positions (such WWAN base stations and/or WLAN access points). The position of the vehicle can also be determined based on backscatter signals received from RFID-MMID tags that include location information for the marker comprising the RFID-MMID tag.

The navigation unit 270 can determine that a marker 105 includes both a radar reflector and a light reflector where the navigation unit 270 determines that the radar reflector is a first distance from a vehicle 110 and the laser reflector is a second distance from the vehicle 110 based on time of flight information for the reflected radar signals and laser signals. The navigation unit 270 can be configured to determine whether the radar reflector and the LiDAR reflector are collocated, which for the purposes of this disclosure indicates that the radar reflector and the LiDAR reflector are integrated together or mounted adjacent to one another. The navigation unit 270 can be configured to determine that the radar reflector and the light reflector are collocated at the same marker if: (1) the difference between the first and second distances is less than a predetermined marker spacing interval; and/or (2) the difference is less than an expected accuracy of the radar transceiver that transmitted the radar signal and received the reflected radar signal from the marker 105. In some implementations, the navigation unit 270 can use a predetermined marker spacing interval that indicates how far apart the radar reflector and the light reflector would have to be before the navigation unit 270 determines that the reflectors are not collocated. The navigation unit 270 can also or alternatively use the expected accuracy of the radar transceiver when determining whether the radar reflector and the light reflector are collocated on the same marker 105. The navigation unit 270 can determine that the two reflectors are not collocated responsive to the distance between the two reflectors being greater than the expected accuracy of the radar transceiver. For example, if the radar transceiver is an MRR having an expected accuracy within 7.5 centimeters, the navigation unit 270 can be configured to determine that the two reflectors are not collocated if the two reflectors are determined to be more than 7.5 centimeters apart based on the reflected LiDAR and radar signals.

In this example mapping technique, reflectors that are collocated with the LiDAR reflectors can be marked as anchor markers in the map data since the locations of these markers are known with a high level of certainty (e.g., within 2 centimeters depending upon the accuracy of the LiDAR transceiver utilized). Other markers having radar reflectors and/or RFID-MMID tags can also be included in the map data. The locations of LiDAR reflectors can also be included in the map data. The map data collected by the navigation system of the vehicle 110 can be provided to a navigation server that collects and stores maps of marker locations that can be downloaded by vehicle navigation systems, pushed out to vehicle navigation systems configured to receive such map information from the navigation server, and/or installed by on the navigation system at the time that the navigation system is configured by a manufacturer or dealer of the vehicle or device in which the navigation system is installed.

FIG. 10 is a flow diagram of an example process for generating navigational data according to the techniques disclosed herein. The process illustrated in FIG. 10 can be implemented by the navigation unit 270 of the vehicle 110 unless otherwise specified.

Navigation data for a navigable environment can be generated (stage 1005). The navigational data can include locations of radar-reflective markers disposed throughout the navigable environment and generating the navigational data can include determining the locations of the radar-reflective markers using light-reflective markers disposed throughout the navigable environment. As discussed above, the navigation unit 270 of the vehicle can operate both the LiDAR transceiver(s) and the radar transceiver(s) of the vehicle 110 to generate navigation data that identifies the locations of light-reflective and radar-reflective markers disposed within the navigable environment. At least a portion of the radar-reflective markers can be collocated with light-reflective markers. The navigation unit 270 can be configured to identify such radar-reflective markers and can determine a more accurate location for these markers based on the LiDAR than may otherwise be possible using radar alone. Furthermore, the radar-reflective markers can comprise coarse-resolution markers based on radar-reflective infrastructure elements, fine-resolution markers that comprise radar-reflective elements mounted on existing infrastructure elements, or a combination thereof.

FIG. 11 is a flow diagram of an example process for generating navigational data according to the techniques disclosed herein. The technique illustrated in FIG. 11 can be used to implement, at least in part, stage 1005 of the process illustrated in FIG. 10. The process illustrated in FIG. 11 can be implemented by the navigation unit 270 of the vehicle 110 unless otherwise specified.

The LiDAR transceiver of the vehicle can be operated to obtain signals from a light-reflective marker disposed along a travel route through the navigable environment (stage 1105). The radar transceiver of the vehicle can be operated to obtain signals from a radar-reflective marker disposed along a travel route through the navigable environment (stage 1110). As discussed above, the vehicle 110 can travel through the navigable environment while operating both the LiDAR and radar transceivers of the vehicle and monitoring for reflections from optical and radar reflectors. The radar reflection may be received from a coarse-resolution or a fine-resolution marker. The navigation unit 270 of the vehicle can be configured to distinguish between signals received from coarse-resolution and fine-resolution markers based on the differences in the radar cross section of the two types of marker. Once a LiDAR and radar reflection have been detected, a determination can be made whether the light-reflective marker and the radar-reflective marker are collocated (stage 1115). The navigation unit 270 of the vehicle can use the techniques discussed above to determine whether the light-reflective and radar-reflective markers are collocated. The navigation unit 270 can add the collocated markers as anchor markers in the navigation data that is being generated. The locations of the anchor markers can be determined with greater accuracy due to the presence of the light-reflective markers. Vehicles navigating the navigable environment using the navigation data can then make accurate location determinations using the anchor markers. The navigation unit 270 can also be configured to include in the navigation data the light-reflective marker locations determined using the LiDAR transceiver. The navigation unit 270 can also be configured to include in the navigation data the radar-reflective marker locations determined using the radar transceiver that were not collocated with a light-reflective marker.

FIG. 16 is a flow diagram of a process for operating a navigation system according to the techniques disclosed herein. The process illustrated in FIG. 16 can be implemented by the navigation unit 270 of the vehicle 110 unless otherwise specified. The technique illustrated in FIG. 16 uses radar and LiDAR based localization techniques to determine a location solution for a vehicle. However, camera-based solutions may be used in addition to or instead of the LiDAR based position solution.

A first localization solution associated with the location of a vehicle within a navigable environment can be determined using a radar transceiver of the navigation system (stage 1605). The navigation unit 270 of the vehicle 110 can be configured to determine a first localization solution using one or more radar transceivers of the navigation system. As discussed in the preceding examples, the radar transceiver(s) of the vehicle can be used to transmit radar signals and the radar transceiver(s) can be configured to receive reflected radar signals and/or backscatter from markers 105 that fall within the range of the radar transceiver(s). The navigation unit 270 can be configured to determine a localization solution based on the reflected radar signals and/or backscatter that represents an estimated location of the vehicle within the navigable environment using any of the localization techniques discussed in the preceding examples or other localization techniques.

A second localization solution associated with the location of the vehicle within the navigable environment can be determined using a LiDAR transceiver of the navigation system (stage 1610). The navigation unit 270 of the vehicle 110 can be configured to determine a second localization solution using one or more LiDAR transceivers of the navigation system. As discussed in the preceding examples, the LiDAR transceiver(s) of the vehicle can be used to transmit signals laser signals and the LiDAR transceiver(s)

can be configured to receive reflected radar signals markers 105 that fall within the range of the LiDAR transceiver(s). The navigation unit 270 can be configured to determine a localization solution based on the reflected LiDAR signals that represents an estimated location of the vehicle within the navigable environment using any of the localization techniques discussed in the preceding examples or other localization techniques.

The second localization solution can be determined using a camera-based solution instead of or in addition to the LiDAR-based localization solution. The navigation unit 270 can be configured to utilize one or more optical sensors of the vehicle to capture images of the lane marker lines, signage, markers 105, and/or other infrastructure surrounding the vehicle. The navigation unit 270 can be configured to calculate a localization solution based on the imagery captured by the camera(s).

A localization solution can be selected from the first and second localization solutions based on whether an accuracy of the first localization solution exceeds an accuracy of the second localization solution (stage 1615). A localization solution can be selected from the first and/or second localization solutions based on the accuracy and/or reliability of the localization solutions. As discussed in the preceding examples, a reliability score can be determined for each of the localization solution solutions, and a respective one of the localization solutions can be discarded if the reliability score for the localization solution is less than the reliability threshold associated with that type of localization solution. If both of the localization solutions do not meet the reliability thresholds, then an operator of the vehicle can be alerted to assume control over the navigation of the vehicle. The operator may be located in the vehicle and can assume manual control of the vehicle. The operator may be located remotely from the vehicle and can assume control over the vehicle via a wireless connection.

LiDAR is typically more accurate than radar for the various reasons discussed in the preceding examples unless adverse conditions exist in the operating environment. Camera-based solutions may also be more accurate than radar-based solutions under optimal operating conditions. Accordingly, the LiDAR-based localization solution will typically be more accurate than the radar-based localization solution. However, environmental conditions, such as snow, rain, fog, smoke, dust, particulate matter, or other such conditions may adversely affect the accuracy LiDAR-based and/or camera-based solutions. Accordingly, the navigation unit 270 can be configured to make a determination whether the second localization solution determined using LiDAR and/or camera(s) falls within the localization solution determined using radar.

As discussed in the preceding examples, each of the localization solutions can represent an estimated location of the vehicle within the navigable environment and may represent an area or volume in which the actual location of the vehicle falls (see e.g. FIGS. 4A, 4B, 4C, and 13). Each of the solutions are typically represent an area or volume in which the actual location of the vehicle falls. In situations where the performance of the LiDAR and/or camera is degraded, the location solution may exceed the area or volume represented by the radar-based solution, which indicates that the LiDAR and/or camera-based solution is less accurate than the radar-based solution and the radar-based solution will be selected by the navigation unit 270. Alternatively, where the LiDAR and/or camera-based location solution falls within the area or volume represented by the radar-based solution, the LiDAR and/or camera-based location solution is more accurate than the radar-based solution and will be selected by the navigation unit 270. This approach is similar to that discussed with respect to the process illustrated in FIG. 9, which compares area-based localization solutions to determine whether one localization solution falls within the other localization solution.

Some localization solutions may determine a point that represents the estimated location of the vehicle within the navigable environment rather than producing an area or volume in which the actual location of the vehicle is estimated to be. A process, such as the example process illustrated in FIG. 8, can be used to select a localization solution in such implementations.

One or more actions can be performed based on the localization solution (stage 1620). The navigation unit 270 can be configured to perform various actions based on the localization solution and an operating mode in which the vehicle is utilized. Where the vehicle is operating in an autonomous or semi-autonomous mode, the navigation unit 270 can use the localization solution to navigate the vehicle through the navigable environment, such as in the example process illustrated in FIG. 18. The navigation unit 270 can also be configured to generate one or more alerts, such as in the example process illustrated in FIG. 19. The alerts can be informational or can be actionable alerts that require the driver of the vehicle take some action. Information alerts can be used to provide information about adverse driving conditions, an upcoming point of interest or a destination, or other information that may be useful to the driver. Actionable alerts require can be used to indicate to the driver that a situation has arisen where the navigation unit 270 requires the driver to assume manual control of the vehicle. Such alerts can be generated responsive to adverse environmental conditions, sensor problems, or other situations where the navigation unit 270 is unable to continue to navigate the vehicle without driver input. The navigation unit 270 can also be configured to provide the localization solution information to the driver when operating in a driver-assist mode, such as in the example process illustrated in FIG. 20. In driver-assist mode, the driver has manual control over the operation of the vehicle, but the navigation unit 270 can provide navigational information and/or additional information to the driver, such as lane departure warning information, collision avoidance warning information, and other such information that can assist the driver in operating the vehicle. The navigation unit 270 may have limited control over some systems, such as the vehicle braking system while operating in the driver-assist mode. The navigation unit 270 can be configured to perform more than one type of action in response to the localization solution. For example, the navigation unit 270 may navigate the vehicle using the localization solution and provide an alert to the driver that the vehicle is approaching a navigation destination. This is only one example of the navigation unit 270 performing more than one action. The navigation unit 270 may perform other combinations of actions responsive to the localization solution.

FIG. 17 is a flow diagram of a process for selecting a navigation system according to the techniques disclosed herein. The process illustrated in FIG. 17 can be implemented by the navigation unit 270 of the vehicle 110 unless otherwise specified. The technique illustrated in FIG. 17 uses a radar and LiDAR based techniques to determine a location solution for a vehicle. However, camera-based solutions may be used in addition to or instead of the LiDAR based position solution. The process illustrated in FIG. 17 can be used to implement, at least in part, stage 1615 of the process illustrated in FIG. 16, and can be used to select a localization solution in the other example processes disclosed herein. The process illustrated in FIG. 17 can be used to select between to different localization solutions that have provided an estimated location of the vehicle that is represented by an area within the navigable environment in which the vehicle is located. The location may be represented as an area rather than a point location due to errors in the localization measurements (due to interference, environmental conditions, etc.) and/or errors in the position determination calculations. In the example process of FIG. 17, a first and second localization solution have been determined by the navigation unit 270 using different localization technique (e.g. camera-based, LiDAR-based, radar-based (LRR/MRR/SRR)).

A determination is made whether the second localization solution falls within the first localization solution (stage 1705). A determination can be made whether the second localization solution encompasses a smaller area or volume that the first localization solution, and a determination can be made whether the second localization falls within the area or volume represented by the first localization solution. If these conditions are met, then the second localization solution is more accurate than the first localization solution.

The second localization solution can be selected responsive to the second localization solution falling within the first localization solution (stage 1710). Otherwise, the navigation unit 270 can select the first localization solution. The navigation unit 270 can use the selected navigation solution for navigating the vehicle through the navigable environment.

FIG. 18 is a flow diagram of a process for operating a navigation system according to the techniques disclosed herein. The process illustrated in FIG. 18 can be implemented by the navigation unit 270 of the vehicle 110 unless otherwise specified. The process illustrated in FIG. 18 can be used to implement, at least in part, stage 1620 of the process illustrated in FIG. 16, and can be used to perform an action in response to a selected localization solution in the other example processes disclosed herein.

The selected localization solution can be used to navigate the vehicle through the navigable environment (stage 1820). The navigation unit 270 can use the selected navigation solution to assist in navigating the vehicle through the navigable environment. The navigation unit 270 can be configured to send control signals to the vehicle control unit 275 to navigate the vehicle 110 through the navigable environment based to the selected localization solution. The navigation unit 270 can use map information for the navigable environment that includes information for roadways and/or other navigable areas and the locations of the markers 105 disposed throughout the navigable environment. The navigation unit 270 can be configured to determine additional localization solutions as the vehicle progresses through the navigable environment. The navigation unit 270 can also be configured to perform the process illustrated in FIG. 16 again and/or one of the preceding example processes to determine whether a different localization technique should be utilized due to changing environmental conditions, changes in the types of markers that are present in the navigable environment, and/or other conditions that can result in different localization techniques providing a more accurate solution.

FIG. 19 is a flow diagram of a process for operating a navigation system according to the techniques disclosed herein. The process illustrated in FIG. 18 can be implemented by the navigation unit 270 of the vehicle 110 unless otherwise specified. The process illustrated in FIG. 18 can be used to implement, at least in part, stage 1620 of the process illustrated in FIG. 16, and can be used to perform an action in response to a localization solution in the other example processes disclosed herein.

An alert to a driver of the vehicle can be generated based on the localization solution (stage 1905). The navigation unit 270 can be configured to send an alert to a driver of the vehicle responsive to the localization solution. The alert can be in response to the navigation unit 270 being unable to determine a localization solution with a sufficient accuracy and/or reliability. Alerts can be actionable alerts that require the driver to take some action or can be informational alerts that provide information to the driver of the vehicle. The alert can be used to signal that the driver should assume manual control over the vehicle. Such an alert can also be used where a driver has already assumed manual control over the vehicle, but the accuracy and/or reliability of the localization solution has been degraded due to adverse weather conditions, such as rain, snow, fog, dust, smoke, dust, and/or other airborne matter that can obscure visual indicators used by camera-based localization techniques and can scatter, reflect, and/or absorb the lasers used by LiDAR-based localization techniques. Alerting the driver to such adverse conditions can notify the driver to be cautious due to conditions that may impair visibility and maneuverability. Informational alerts can be used to signal to the driver that the vehicle is approaching a navigation destination and/or a point of interest along a navigation route. Other types of informational alerts can also be provided by the navigation unit 270.

The alerts generated by the navigation system can be visual, audible, and/or haptic alerts. The navigation unit 270 can be configured to generate visual alerts on a display of the navigation system of the vehicle. The navigation unit 270 can also be configured to generate visual alerts on one or more other displays of the vehicle 110, including but not limited to a dash-mounted display and/or a heads-up display. The visual alert can include text, graphics, animations, and/or other visual indications to convey the alert. The navigation unit 270 can also be configured to generate audible alerts that can be played through one or more speakers of the navigation system of the vehicle, through one or more speakers of a sound system or entertainment system of a vehicle, and/or through a wireless headset or other similar device worn by a driver of the vehicle. The audible alerts can include recorded or synthesized voice content providing the contents of the alert. The audible alerts can include an audible signal or tone, and different signals or tones can be associated with different types of alerts to allow the driver to differentiate between the types of alerts. The navigation unit 270 can be also be configured to generate haptic alerts. One or more components of the vehicle, such as the steering wheel and/or the driver's seat can include haptic device that can be induced to vibrate in order to convey information to the driver. In other implementations, the navigation unit 270 can interface with a device that can be worn by the drive of the vehicle that can provide haptic feedback to the driver. The navigation unit 270 can be configured to interface with such haptic devices to provide alerts to the driver of the vehicle. The navigation unit 270 can induce a haptic device to vibrate using different vibration patterns to indicate types of alerts to allow the driver to differentiate between the types of alerts.

FIG. 20 is a flow diagram of a process for operating a navigation system according to the techniques disclosed herein. The process illustrated in FIG. 20 can be implemented by the navigation unit 270 of the vehicle 110 unless otherwise specified. The process illustrated in FIG. 20 can be used to implement, at least in part, stage 1620 of the process illustrated in FIG. 16, and can be used to perform an action in response to a localization solution in the other example processes disclosed herein.

The localization solution can be provided to a driver of the vehicle (stage 2005). The navigation solution can be displayed to the driver of the vehicle on a display of the navigation unit 270 and/or on another display of the vehicle to provide the driver with an indication of the location of the vehicle within the navigable environment. The location information can be for informational purposes where the vehicle is operating autonomously or semi-autonomously, and the navigation unit 270 currently has control over the operation of the vehicle. The location information can also be provided to the driver while the vehicle is being operated in a driver-assist mode in which navigational information and/or other assistance information can be presented to the driver through visual, audible, and/or haptic updates.

If implemented in-part by hardware or firmware along with software, the functions can be stored as one or more instructions or code on a computer-readable medium. Examples include computer-readable media encoded with a data structure and computer-readable media encoded with a computer program. Computer-readable media includes physical computer storage media. A storage medium can be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations can be performed in parallel or concurrently. In addition, the order of the operations may be rearranged. A process may have additional stages not included in the figure.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and can be based on one or more items and/or conditions in addition to the stated item or condition.

What is claimed is:

1. A method for operating a navigation system of a vehicle, the method comprising:
 determining a first localization solution associated with a location of the vehicle in a navigable environment using a radar transceiver of the navigation system;
 determining a second localization solution associated with the location of the vehicle in the navigable environment using a LiDAR transceiver, a camera, or both of the navigation system;
 determining whether the accuracy of the first localization solution exceeds an accuracy of the second localization solution by:
  determining a distance between the first localization solution and the second localization solution;
  determining whether the distance exceeds an expected accuracy of the second localization solution;
 selecting a localization solution from the first and second localization solutions based on the determination whether the accuracy of the first localization solution exceeds the accuracy of the second localization solution; and
 performing one or more actions based on the selected localization solution.

2. The method of claim 1, wherein performing the one or more actions using the localization solutions comprises:
 navigating the vehicle through the navigable environment using the selected vehicle localization solution.

3. The method of claim 1, wherein performing the one or more actions using the localization solutions comprises:
 generating an alert to a driver of the vehicle based on the localization solution.

4. The method of claim 1, wherein performing the one or more actions using the localization solutions comprises:
 providing the localization solution to a driver of the vehicle.

5. The method of claim 1, further comprising:
 selecting the first localization solution responsive to the distance exceeding the estimated accuracy of the second localization solution.

6. The method of claim 1, further comprising:
 selecting the second localization solution responsive to the distance not exceeding the estimated accuracy of the second localization solution.

7. The method of claim 1, further comprising determining whether the accuracy of the first localization solution exceeds an accuracy of the second localization solution by:
 determining whether the second localization solution falls within the first localization solution; and
 selecting a localization solution from the first and second localization solutions based on whether the second localization falls within the first localization solution, such that the first localization solution is selected unless the second localization solution falls within the second localization solution.

8. The method of claim 1, wherein selecting the localization solution further comprises:
determining a reliability score for each localization solution; and
discarding each localization solution for which the reliability score associated with that localization solution is less than a predetermined threshold.

9. The method of claim 1, wherein selecting a first localization solution or a second localization solution comprises determining whether the first localization solution and the second localization solution fall within a navigable region.

10. The method of claim 9, wherein the first localization solution is based on received signals from polarized radar reflectors, and wherein the radar transceiver utilizes dual-polarized radar.

11. The method of claim 1, further comprising:
identifying malfunctioning or missing radar-reflective or light-reflective markers; and
sending information to a navigation server identifying the malfunctioning or missing markers.

12. A navigation system comprising:
a radar transceiver configured to transmit signals to and receive return signals from radar-reflective markers disposed in a navigable environment;
a LiDAR transceiver configured to transmit signals to and receive return signals from light-reflective markers disposed in the navigable environment;
a memory;
a processor coupled to the memory, the radar-transceiver, and the LiDAR transceiver, the processor configured to:
determine a first localization solution associated with a location of the vehicle in the navigable environment using the radar transceiver of the navigation system;
determine a second localization solution associated with the location of the vehicle in the navigable environment using the LiDAR transceiver, a camera, or both of the navigation system;
determine whether the accuracy of the first localization solution exceeds an accuracy of the second localization solution by:
determine a distance between the first localization solution and the second localization solution;
determine whether the distance exceeds an expected accuracy of the second localization solution;
select a localization solution from the first and second localization solutions based on the determination whether the accuracy of the first localization solution exceeds the accuracy of the second localization solution; and
perform one or more actions based on the selected localization solution.

13. A navigation system comprising:
means for determining a first localization solution associated with a location of the vehicle in a navigable environment using a radar transceiver of the navigation system;
means for determining a second localization solution associated with the location of the vehicle in the navigable environment using a LiDAR transceiver, a camera, or both of the navigation system;
means for determining whether the accuracy of the first localization solution exceeds an accuracy of the second localization solution by:
means for determining a distance between the first localization solution and the second localization solution;
means for determining whether the distance exceeds an expected accuracy of the second localization solution;
means for selecting a localization solution from the first and second localization solutions based on the determination whether the accuracy of the first localization solution exceeds the accuracy of the second localization solution; and
means for performing one or more actions based on the selected localization solution.

14. A non-transitory, computer-readable medium, having stored thereon computer-readable instructions for operating a navigation system, comprising instructions configured to cause the navigation system to:
determine a first localization solution associated with a location of a vehicle in a navigable environment using a radar transceiver of the navigation system;
determine a second localization solution associated with the location of the vehicle in the navigable environment using a LiDAR transceiver, a camera, or both of the navigation system;
determine whether the accuracy of the first localization solution exceeds an accuracy of the second localization solution by:
determine a distance between the first localization solution and the second localization solution;
determine whether the distance exceeds an expected accuracy of the second localization solution;
select a localization solution from the first and second localization solutions based on the determination whether the accuracy of the first localization solution exceeds the accuracy of the second localization solution; and
perform one or more actions based on the selected localization solution.

15. The method for generating navigational data, the method comprising:
generating navigational data for the navigable environment, the navigational data comprising locations of radar-reflective markers disposed throughout the navigable environment, wherein generating the navigational data comprises:
operating a LiDAR transceiver of a vehicle to obtain reflected signals from a light-reflective marker disposed along a travel route through the navigable environment;
operating a radar transceiver of the vehicle to obtain reflected radar signals from a radar-reflector marker disposed along a travel route through the navigable environment; and
determining whether the light-reflective marker and the radar-reflective marker are collocated.

16. The method of claim 15, wherein the radar-reflective marker is mounted proximate to the light-reflective marker.

17. The method of claim 15, wherein the radar-reflective marker is integrated with the light-reflective marker.

18. The method of claim 15, wherein determining whether the light-reflective marker and the radar-reflective marker are collocated further comprises:

determining whether the radar-reflective marker is less than a predetermined distance from the light-reflective marker.

19. The method of claim 18, wherein the predetermined distance is an estimated error associated with the radar transceiver.

20. The method of claim 15, wherein the radar-reflective marker comprises a coarse-resolution marker.

21. The method of claim 20, wherein the coarse-resolution marker comprises a radar-reflective component of existing infrastructure.

22. The method of claim 15, wherein the radar-reflective marker comprises a fine-resolution marker, and wherein the fine-resolution marker is disposed on existing infrastructure of the navigable environment.

23. The method of claim 15, further comprising:
   identifying malfunctioning or missing radar-reflective or light-reflective markers; and
   sending updates to the navigational data to a navigation server identifying the malfunctioning or missing markers.

* * * * *